United States Patent [19]

Nonaka et al.

[11] 3,906,802

[45] Sept. 23, 1975

[54] FLUID CRASH SENSOR

[75] Inventors: Kohhei Nonaka; Hitoshi Miura, both of Tokyo; Masayoshi Fukushima, Sakai, all of Japan

[73] Assignee: Asahi Kasei Kogyo Kabushiki Kaisha, Osaka, Japan

[22] Filed: Sept. 16, 1974

[21] Appl. No.: 506,340

Related U.S. Application Data

[63] Continuation of Ser. No. 352,744, April 19, 1973, abandoned.

[30] Foreign Application Priority Data

| Apr. 24, 1972 | Japan | 47-41627 |
| May 29, 1972 | Japan | 47-53683 |
| Oct. 30, 1972 | Japan | 47-109083 |

[52] U.S. Cl. ............................ 73/516 LM; 310/11
[51] Int. Cl.² ............................................ G01P 15/08
[58] Field of Search .......... 73/516 LM, 515, 517 R; 310/11; 200/61.47; 340/262

[56] References Cited
UNITED STATES PATENTS

| 2,063,495 | 12/1936 | Elsom | 73/515 X |
| 2,115,948 | 5/1938 | Erich | 200/61.47 |
| 2,236,790 | 4/1941 | Erich | 200/61.47 |
| 2,753,469 | 7/1956 | Statham et al. | 73/516 LM X |
| 2,776,829 | 1/1957 | Cockram | 73/515 |
| 2,854,539 | 9/1958 | Ruppel | 200/61.45 |
| 2,983,149 | 5/1961 | Lees | 73/516 LM |
| 3,103,120 | 9/1963 | Tinney | 73/517 R X |
| 3,121,336 | 2/1964 | Riordan | 73/516 LM |
| 3,164,023 | 1/1965 | Holderer | 73/516 LM |
| 3,299,703 | 1/1967 | Colvin et al. | 73/194 EM |
| 3,592,187 | 7/1971 | Youdin | 73/194 EM X |
| 3,739,191 | 6/1973 | Nagazumi | 200/61.47 X |

*Primary Examiner*—James J. Gill
*Attorney, Agent, or Firm*—Cooper, Dunham, Clark, Griffin & Moran

[57] ABSTRACT

A shock sensor is provided in which the shocking of a vessel or casing causes a relative movement between a body of fluid contained therein and detection means, resulting in detection in a very short period and with good response of the shock by the detection means in the form of an electrical signal. Either structural or electrical threshold presetting means can be provided to allow detection of only those shocks in excess of a given value. To permit detection of shocks applied from a plurality of directions, the passageway for the fluid can be branched into such directions, with detection means located in a common fluid passage. Damping means can also be provided to suppress noises arising from external vibrations or for imparting a sharply falling trailing edge to the detection signal. Detection means can be constructed to produce a voltage according to Fleming's rule of right hand by arranging for a conductive liquid to move upon shocking in a direction perpendicular to a magnetic field, or to produce an electrical signal by utilizing a change in the electrostatic capacitance or an electromagnetic induction.

25 Claims, 58 Drawing Figures

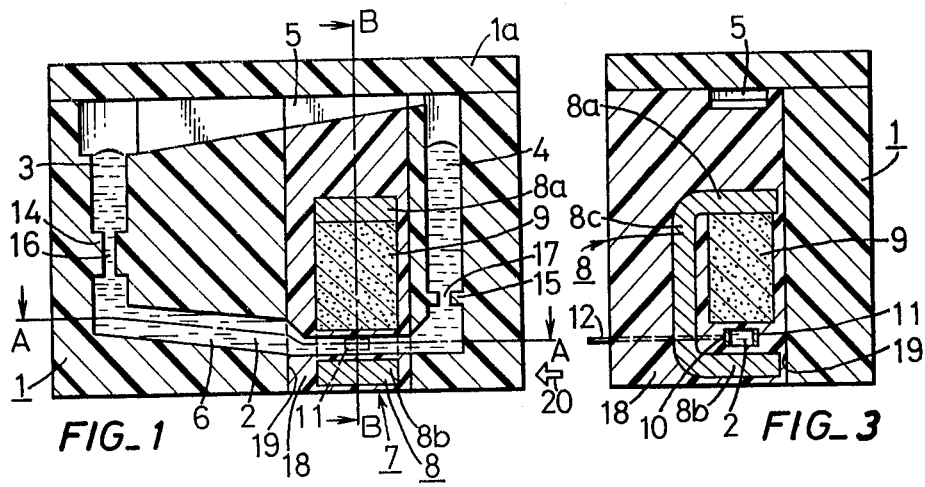
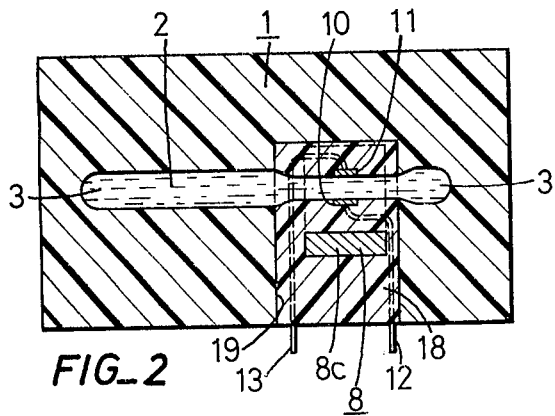
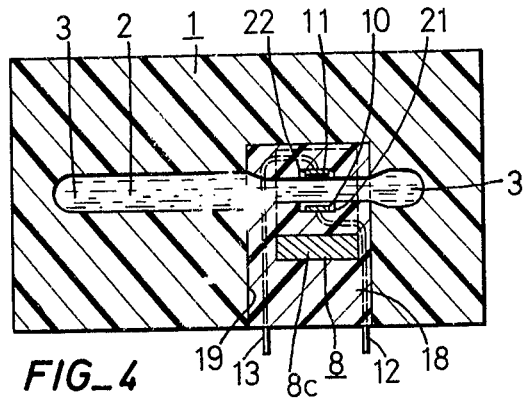

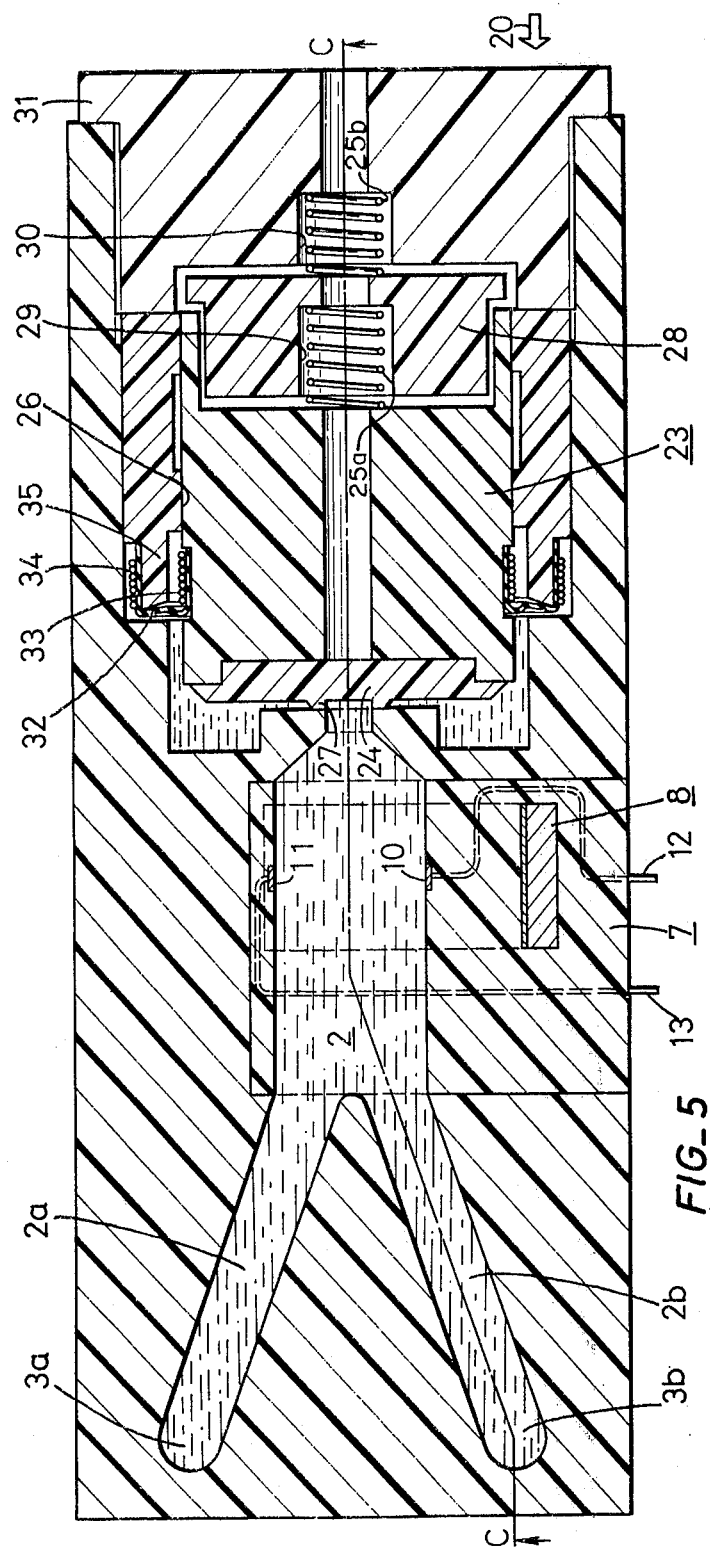
FIG_5

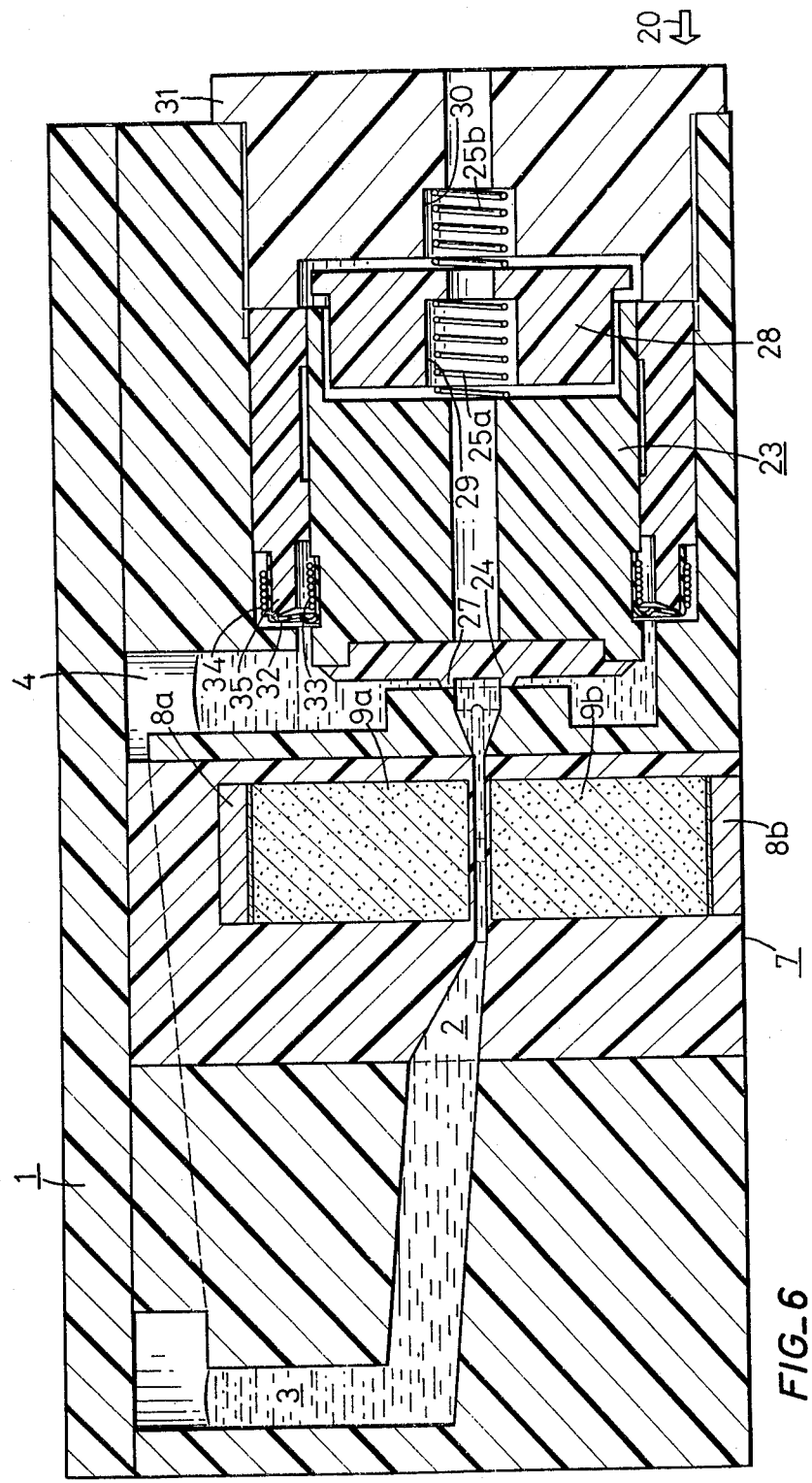
FIG_6

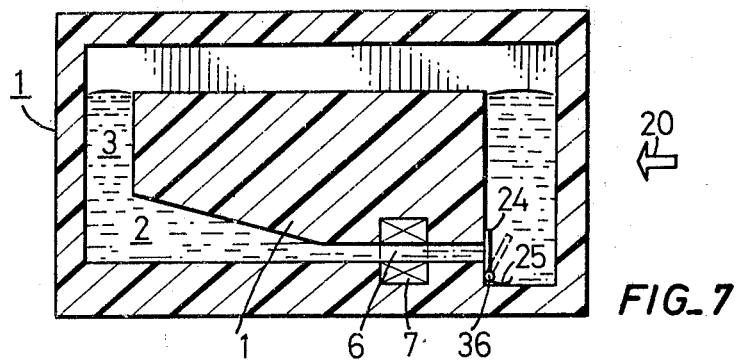
FIG_7
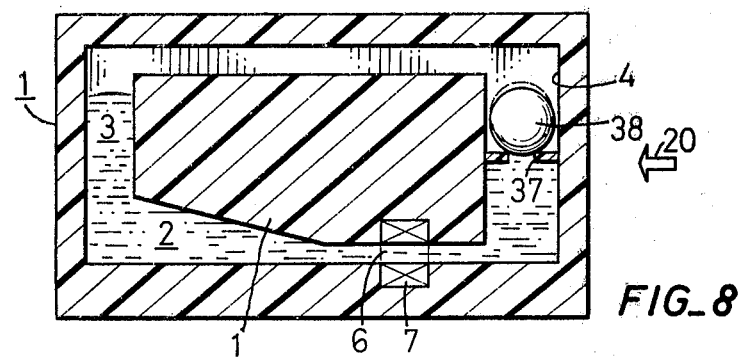
FIG_8
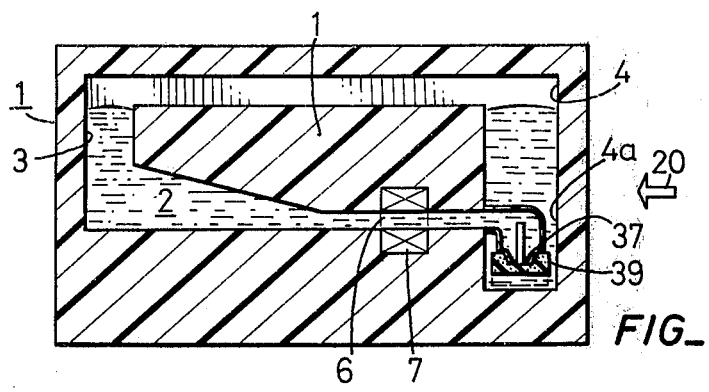
FIG_9
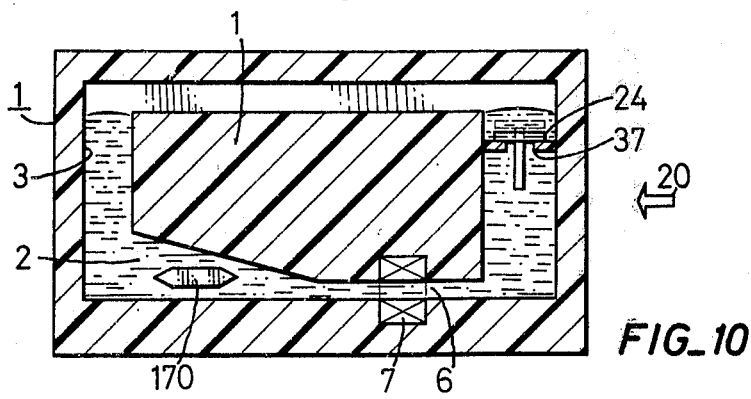
FIG_10

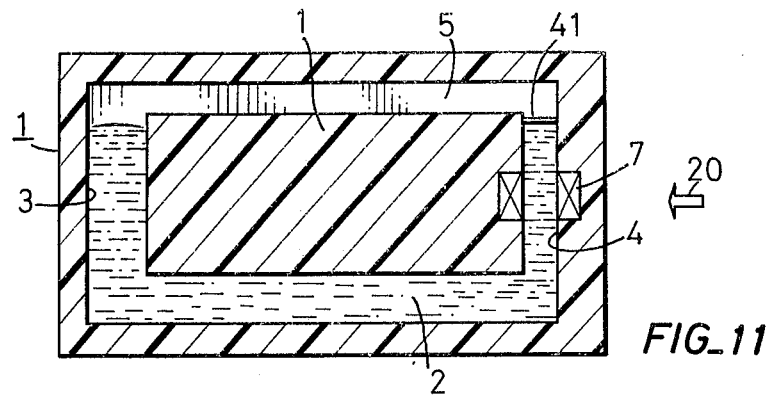
FIG_11
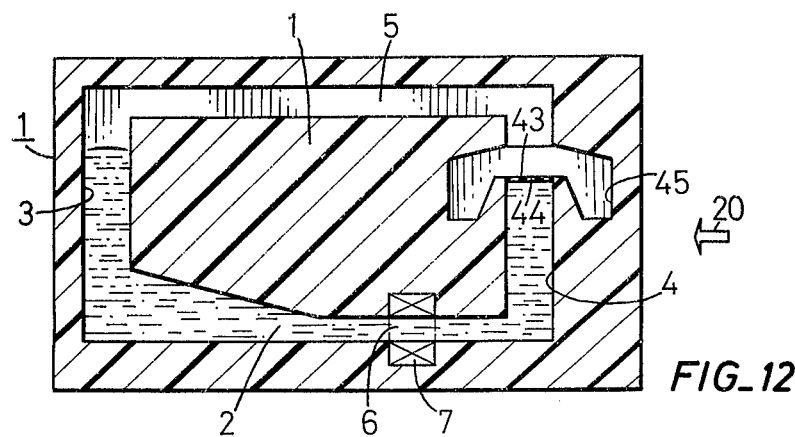
FIG_12
FIG_12A
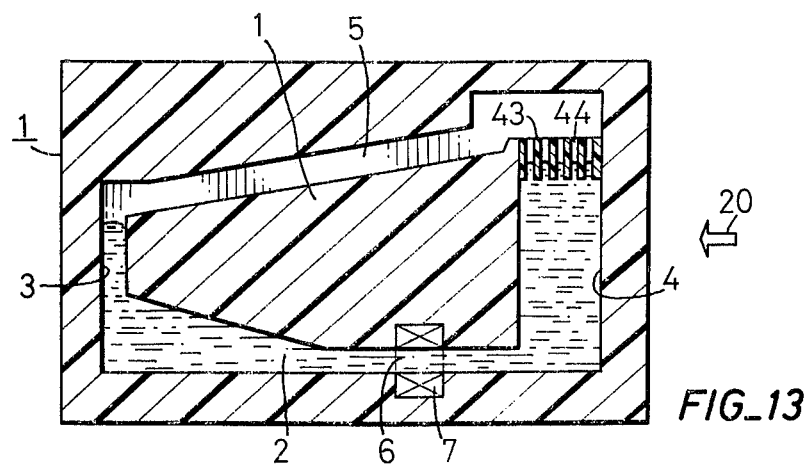
FIG_13

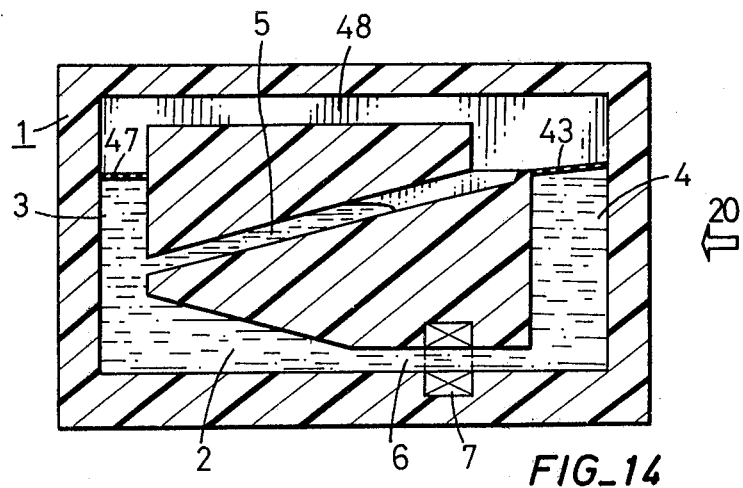
FIG_14
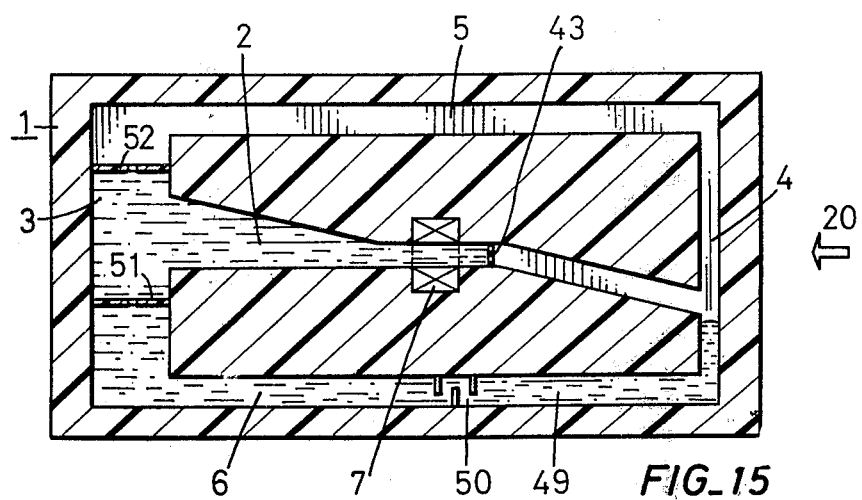
FIG_15

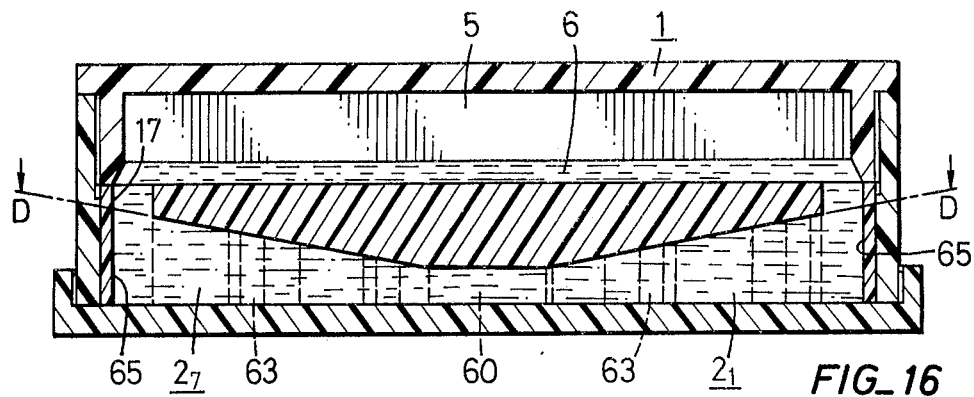
FIG_16
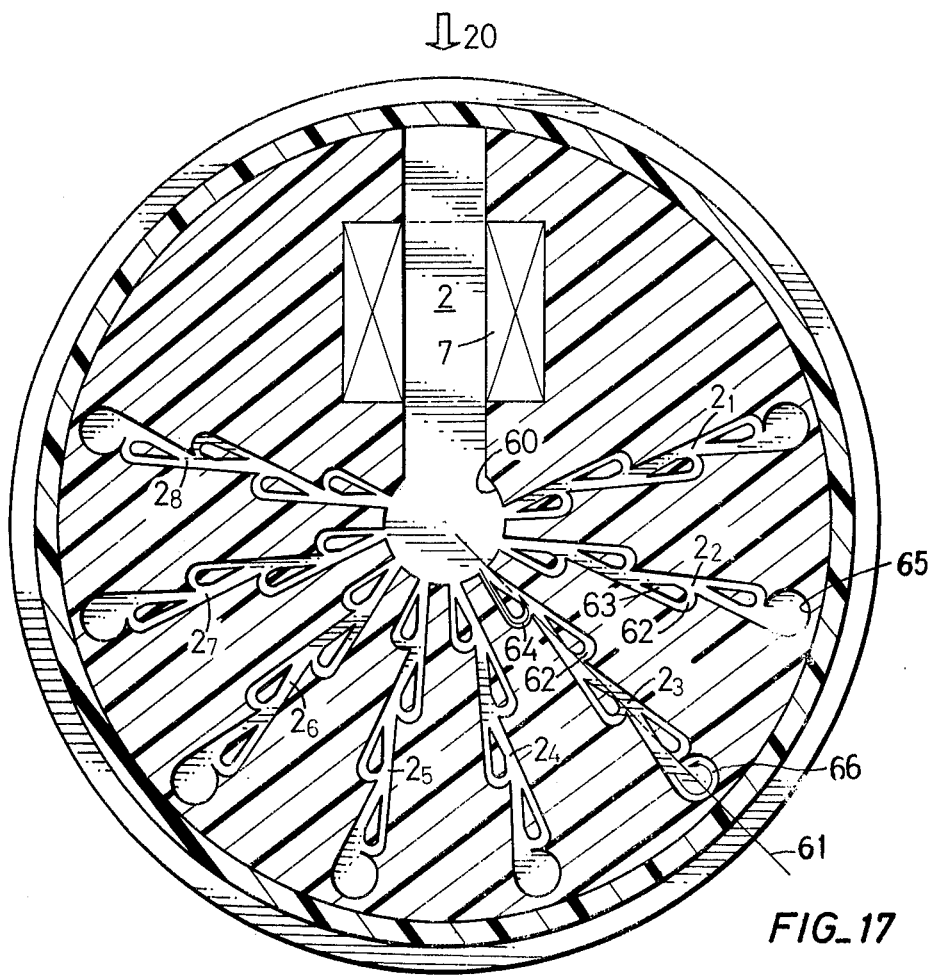
FIG_17

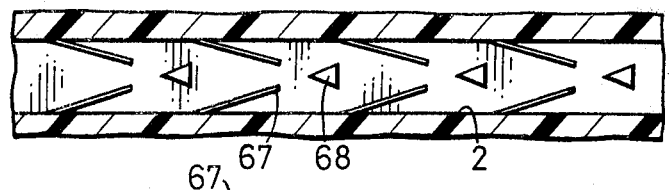
FIG._18
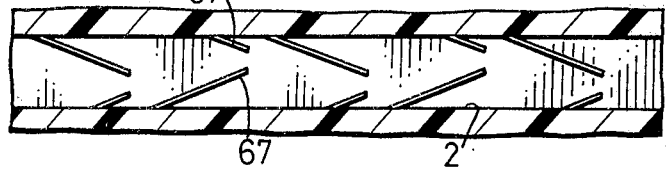
FIG._19
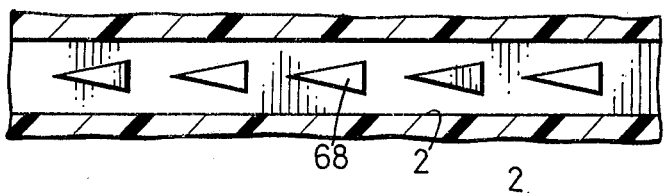
FIG._20
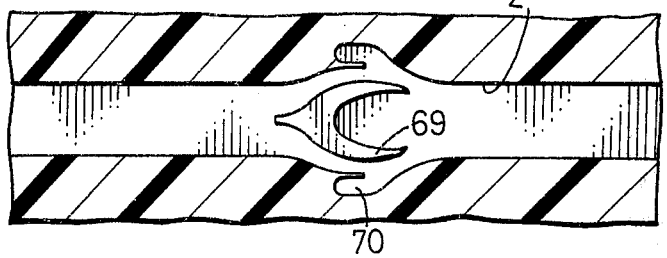
FIG._21
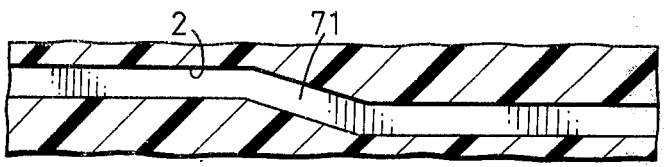
FIG._24A
FIG._24B
FIG._24C
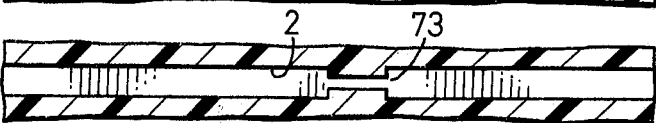
FIG._24D
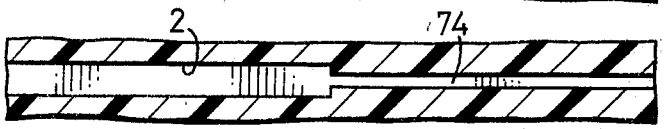
FIG._24E

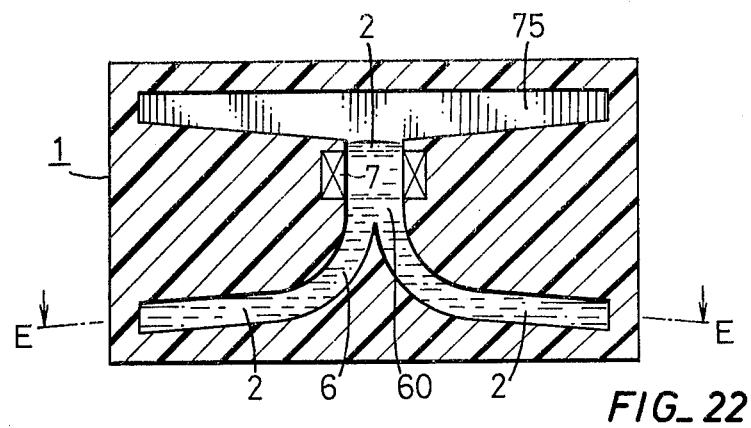
FIG_22
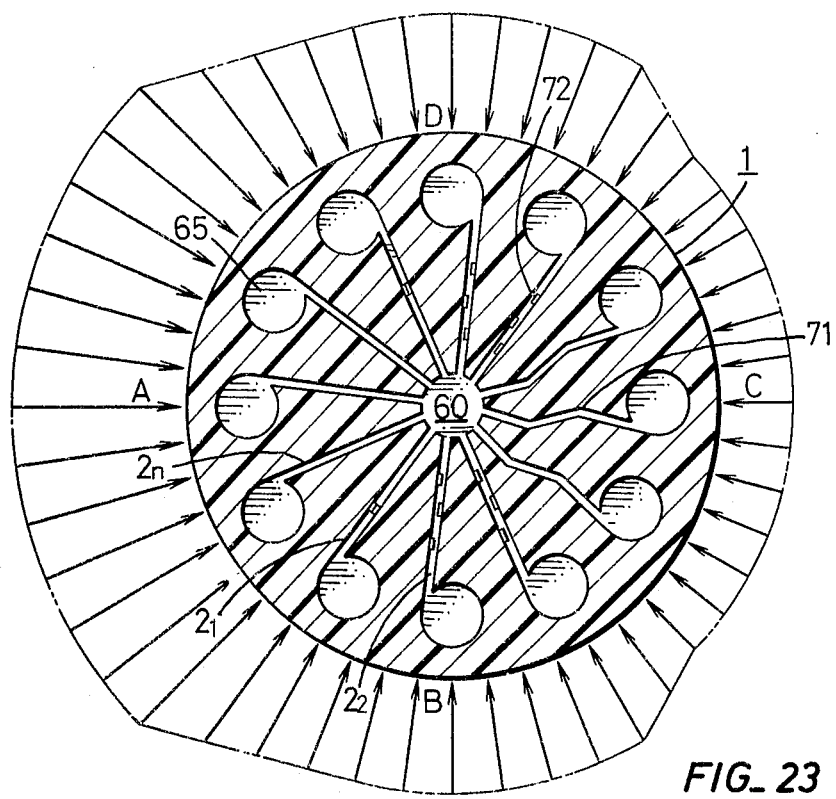
FIG_23

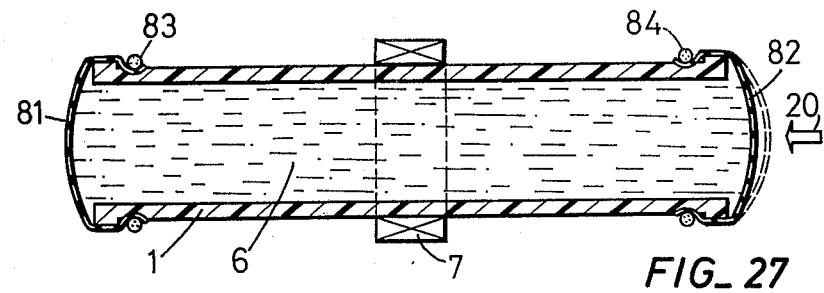
FIG_27
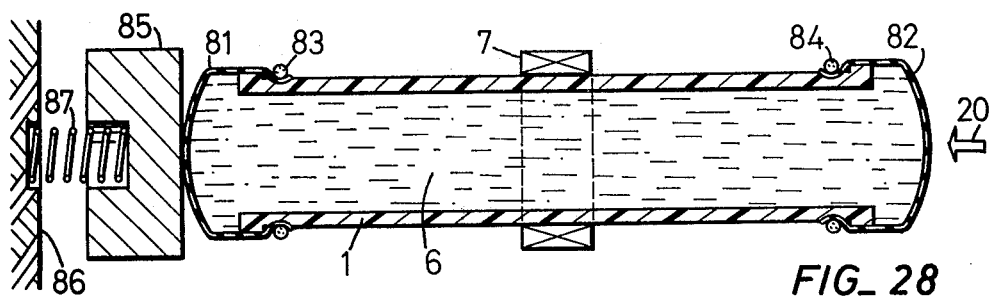
FIG_28
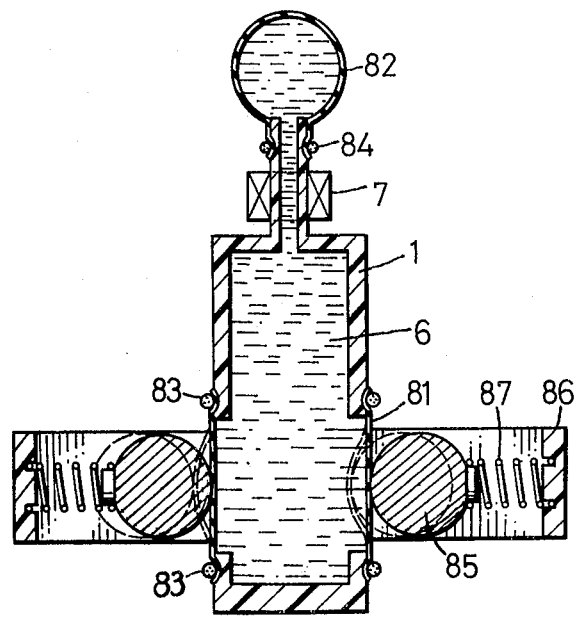
FIG_29

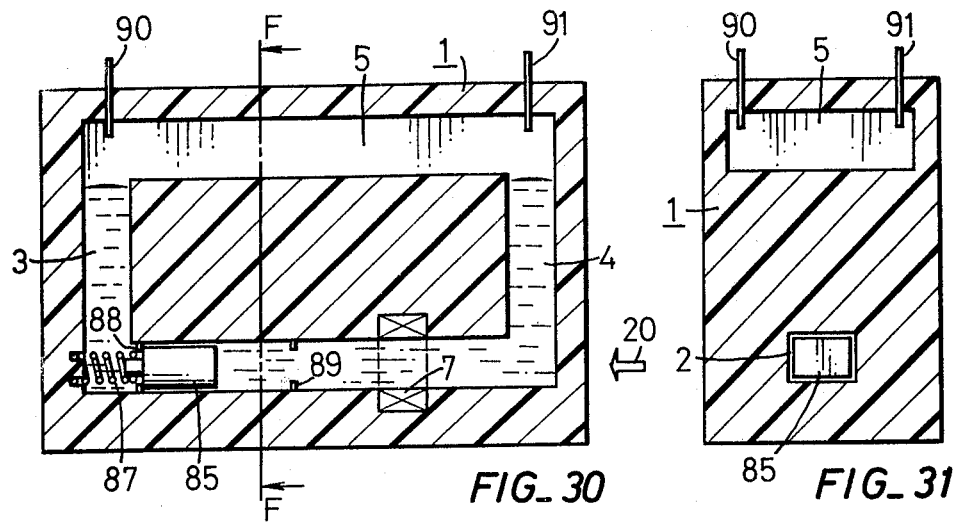
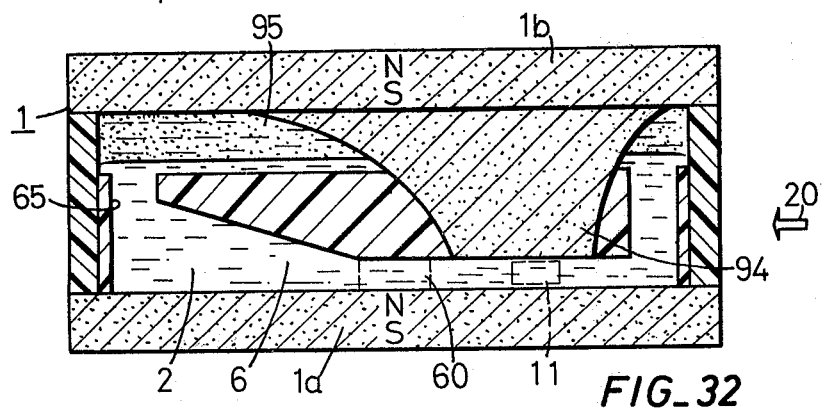
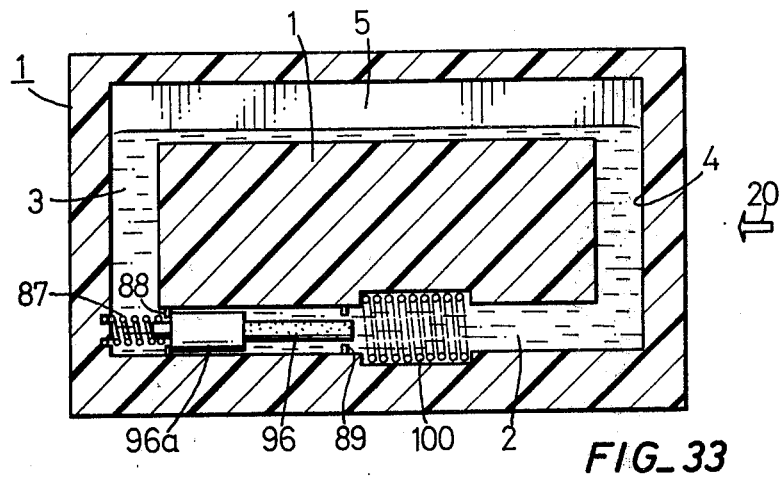

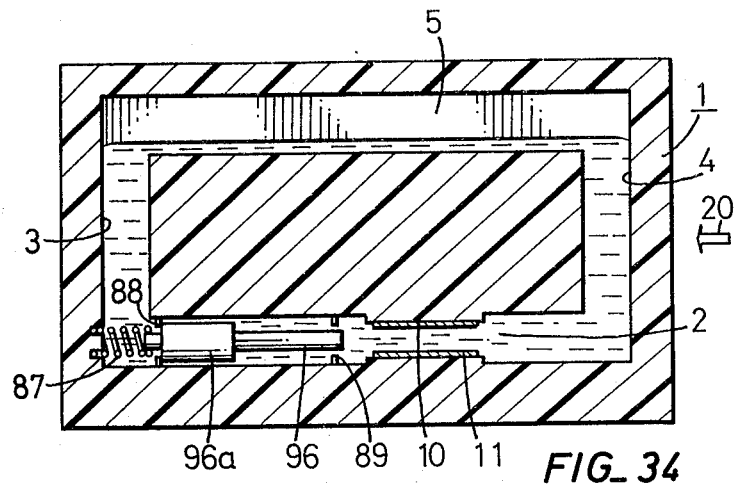
FIG_34
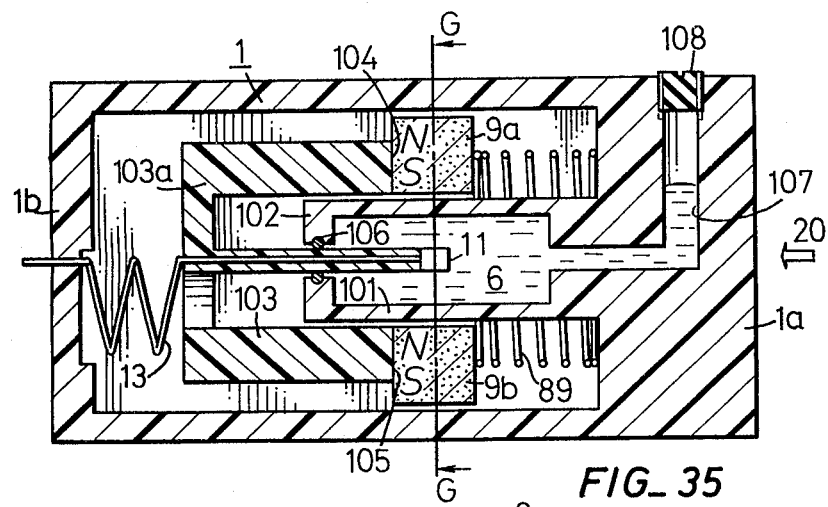
FIG_35
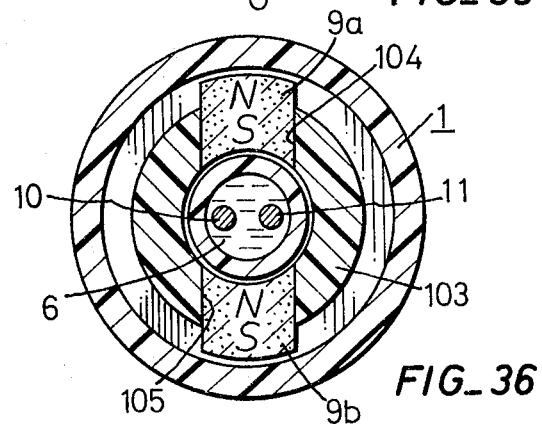
FIG_36

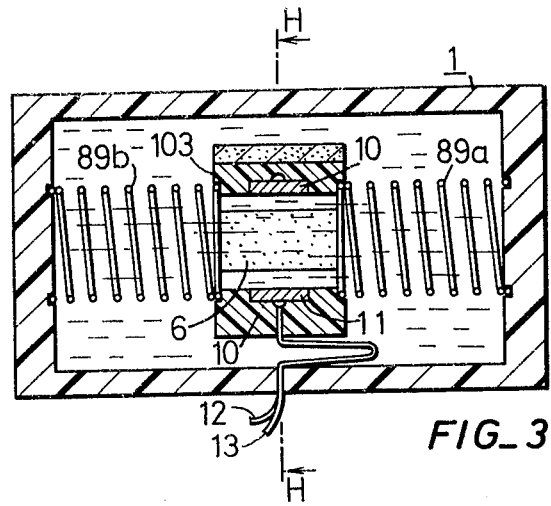
FIG_37
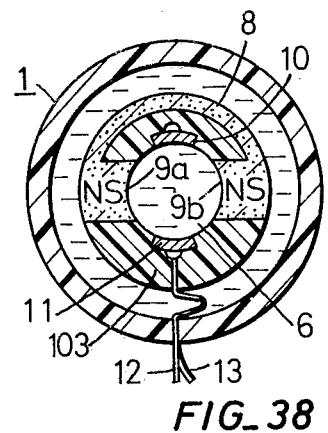
FIG_38
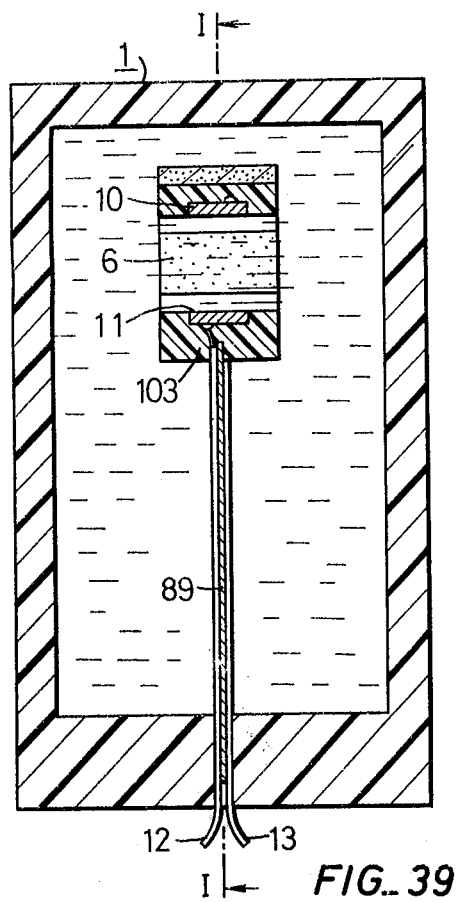
FIG_39
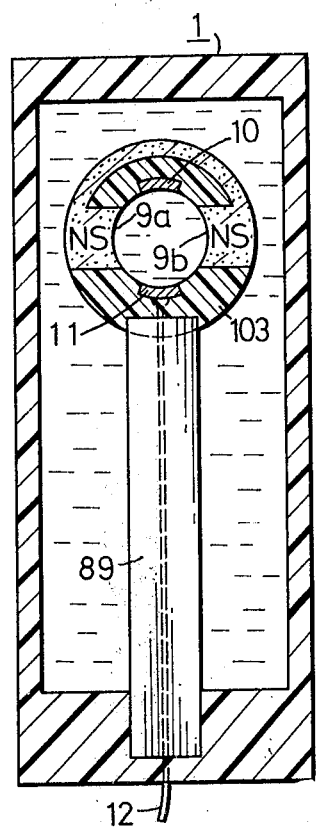
FIG_40

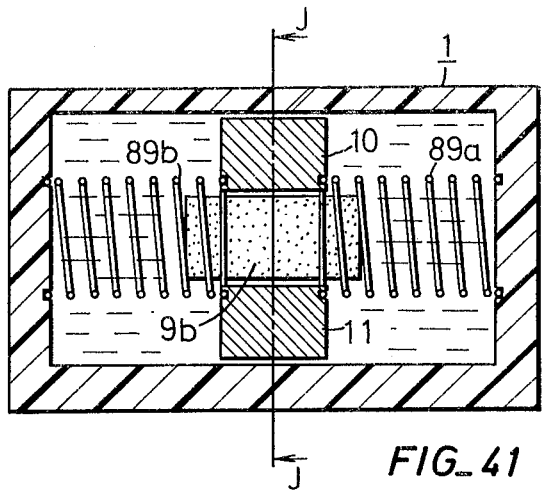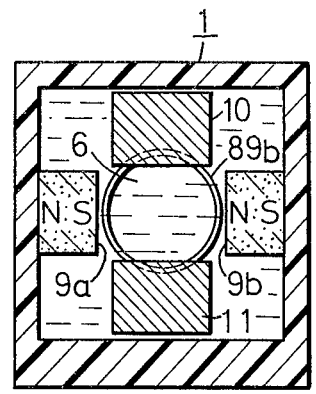
FIG_41  FIG_42
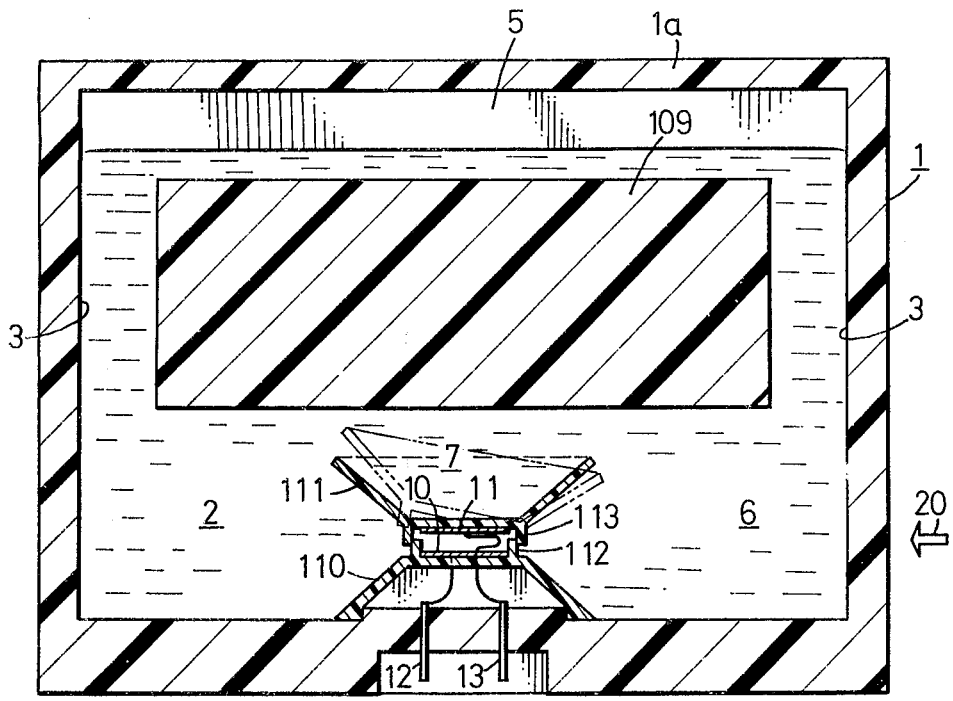
FIG_43

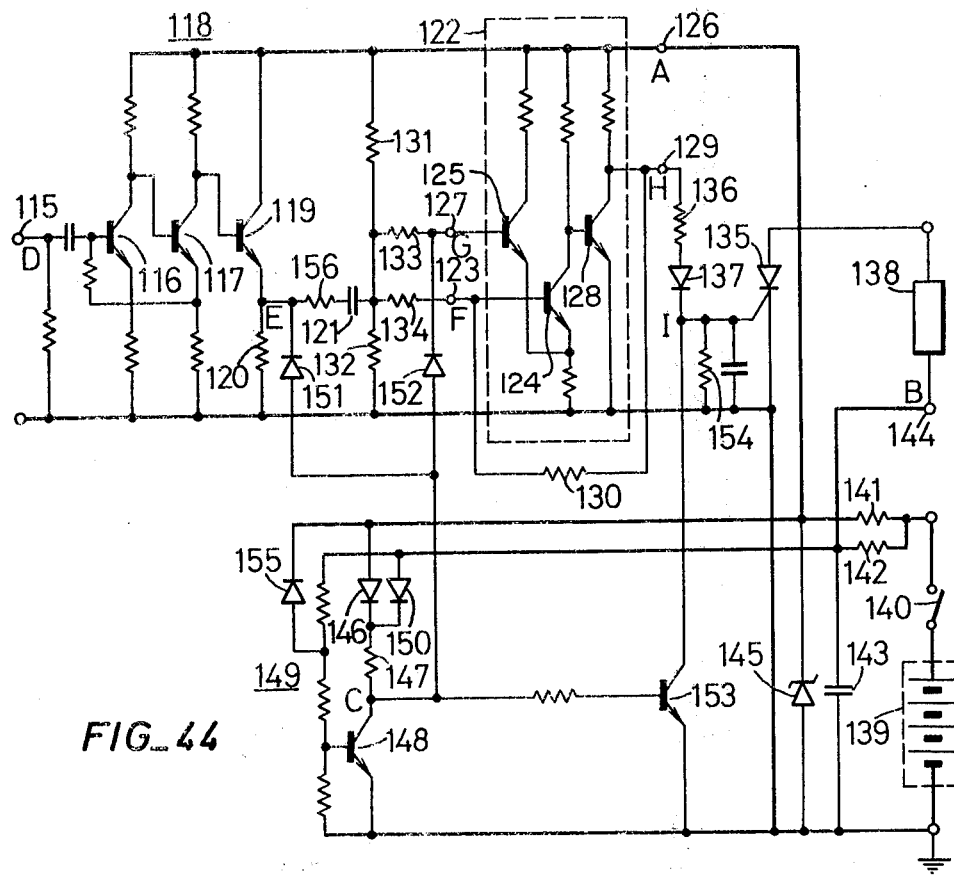
FIG_44
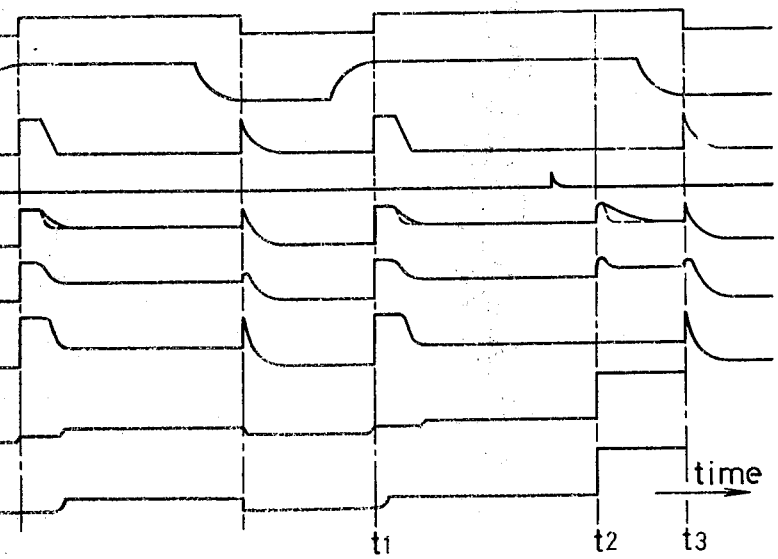
FIG_45A
FIG_45B
FIG_45C
FIG_45D
FIG_45E
FIG_45F
FIG_45G
FIG_45H
FIG_45I

FLUID CRASH SENSOR

This is a continuation division of application Ser. No. 352,744 filed Apr. 19, 1973, now abandoned.

BACKGROUND OF THE INVENTION

The invention relates to a shock sensor which is used to detect the collision of a high speed moving body such as an automobile, for example.

A shock sensor of this kind may be mounted on an automobile, for example, to provide an immediate detection of the occurrence of a collision accident to initiate the expansion of an air bag. Such shock sensors found in the prior art often comprised a mass-spring system. For example, a metal ball is held by a spring at the center of a horizontally disposed metal ring, and an electrical detection circuit is connected across the spring and the ring. Upon being shocked, the ball is urged into contact with the ring to close the circuit.

With a shock sensor constructed in this manner, it will be appreciated that a close spacing between the ball and the ring tends to induce frequent malfunction when it is mounted on an automobile, because of the likelihood of rolling motion causing contact therebetween, while an increased spacing results in a longer period of time being required until the ball moves to contact the ring for detection. Viewed differently, the prior art sensor operates on the principle of double integration with respect to time of a rapid acceleration or deceleration to yield a displacement of the ball, which causes a time lag in the detection process. In addition, the prior art sensor suffers from the operational unreliability resulting from a degradation of the electrical contact formed by mechanical elements such as metal ball and ring which becomes closed upon shocking. Furthermore, the prior art sensor provides only the detection of the presence or absence of a shock without the ability to determine the magnitude of the shock, and is susceptible to mechanical resonance to cause malfunction because of the use of movable parts such as the spring and metal ball.

Therefore, it is an object of the present invention to provide a shock sensor having a reduced detection time and a good response.

It is another object of the invention to provide a shock sensor with high reliability.

It is a further object of the invention to provide a shock sensor capable of detecting the magnitude of a shock.

It is still another object of the invention to provide a shock sensor which is insusceptible to external vibrations and malfunctioning and still simple in design.

It is a still further object of the invention to provide a shock sensor which detects only those shocks in excess of a given magnitude.

It is yet another object of the invention to provide a shock sensor which is adapted to restore its initial status immediately upon detecting a shock.

It is yet a further object of the invention to provide a shock sensor capable of producing a high output.

It is an additional object of the invention to provide a shock sensor having differential sensitivities to the directions of oncoming shocks.

It is a further additional object of the invention to provide a shock sensor capable of detecting shocks from a plurality of directions.

SUMMARY OF THE INVENTION

In accordance with the invention, the shock sensor includes a vessel containing a body of fluid and detection means, and when the vessel is shocked or subject to a rapid acceleration or deceleration, there occurs a relative movement between the body of fluid and the detection means, the latter providing an electrical signal as the detection of the shock. To this end, a fluid passageway is formed in the vessel and contains the fluid. The shock causes the fluid to flow through the passageway, and the detection means provides an electrical signal having a magnitude which depends on the speed of such flow. Conversely, the detection means may be adapted to move relative to the fluid upon shocking. The fluid may comprise an electrically conductive fluid, and in particular mercury in view of its high specific gravity. The mercury may include such an additive as to extend the operable temperature range and/or reduce the contact resistance. The detection means may comprise, for example, means for generating a magnetic field in a direction perpendicular to the flow of the fluid through the passageway, and a pair of opposing electrodes arranged in contact with the fluid and spaced apart in a direction perpendicular to both the direction of flow and the direction of the magnetic field, thus allowing a voltage to be produced across the electrodes which varies with the magnitude of a shock applied according to Fleming's rule of right hand.

The fluid passageway may comprise a common portion in which detection means is located and a plurality of branches communicating with the common portion so as to provide detection of shocks from a plurality of directions or in an angular range or any direction. The common portion of the passageway is formed in substantially the same plane as the branches or in a direction transverse thereto and in crossing relationship therewith. In such an instance, the branches extending in different directions may have differential fluid resistance so as to obtain differential detection sensitivities. Where a plurality of branches are formed extending in different directions, non-return means or reverse flow blocking means may be located therein in a manner to achieve an effective flow of the fluid moving upon shocking through an area in which the detection means is disposed.

Threshold presetting means may be provided to allow a flow of the fluid only when the shock applied exceeds a given magnitude. The threshold presetting means may comprise a threshold member having a small aperture formed therein and which normally blocks the fluid passageway by the surface tension of the fluid, which is therefore constrained to one side of the threshold member. In the event the liquid pressure upon shocking increases sufficiently to exceed a given value, the fluid is forced through the aperture. Aternatively, the fluid passageway may be blocked by a movable member, which is adapted to move or rotate to permit a flow of the fluid therethrough when the fluid pressure exceeds a given value. The threshold can be established in terms of a threshold upon the electrical signal produced upon detection. A trigger signal can thus be obtained when the threshold is exceeded. A circuit to produce such a trigger signal may comprise a charging and discharge circuit through which an electrical signal from the detection means is passed and having a discharge time constant greater than its charging time constant, and an amplifier with positive feedback and connected to receive the output from the circuit, thereby enabling a sharply rising trigger signal of a constant level to be produced in response to a narrow input signal or a slowly rising input signal. Means for eliminating noise components such as caused by external vibrations can be provided in the fluid passageway or may be associated with the electrical signal. Such noise elimination means may be utilized to prevent small shocks from being integrated by suppression of a relative movement between the fluid and detection means upon shocking or to render the sensor immediately prepared for the succeeding shocks. As positive means therefor, means for damping the fluid flow can be provided.

The fluid passageway may or may not include a return path. In the latter instance, a chamber is provided in communication with the pasageway to enable a movement of the fluid, or alternatively, a flexible zone is formed as part of the fluid passageway so that deformation of the flexible zone enables a movement of the fluid. The output can be increased by addition of means which increases the displacement of the fluid by the use of a movable body of a large weight. The output can also be increased by restricting the fluid passageway at a location of the detection means to increase the speed of flow therethrough. Where the flexible zone scheme is adopted, the flexible zone may be adapted to be deformed by a displacement of a driving body to give rise to a flow of the fluid.

When the detection means utilizes a magnetic field, the magnet producing the magnetic field may constitute part of the vessel to give a compact structure. The detection means may also be constructed to induce a change in the eletrostatic capacitance or to produce an electromagnetic induction in response to a relative movement between the liquid and the detection means. Also the use of an electrically insulating fluid is contemplated. A return path or chamber which is provided to enable a movement of the fluid may be filled with a body of second fluid which has a different specific gravity from that of the first mentioned fluid and is insoluble therein so as to suppress noises. A third electrode may be located in the return path or chamber enabling a movement of the fluid so that when there occurs a change in the attitude of the vessel, the fluid contacts the third electrode to indicate such a change of attitude.

BRIEF DESCRIPTION OF DRAWINGS

FIG. 1 is a longitudinal section showing one embodiment of the shock sensor according to the invention, FIG. 2 is a cross section taken along the line A—A shown in FIG. 1, FIG. 3 is a cross section taken along the line B—B shown in FIG. 1, FIG. 4 is a cross section similar to FIG. 2, but illustrating another embodiment of the shock sensor of the invention, FIG. 5 is a cross section showing one embodiment of the shock sensor constructed with threshold presetting means in accordance with the invention, FIG. 6 is a cross section taken along the line C—C shown in FIG. 5, FIGS. 7 to 15 are cross sections showing other embodiments of the shock sensor provided with threshold presetting means, respectively, FIG. 12A is an enlarged cross section of an exemplary threshold member, FIG. 16 is a longitudinal section of an embodiment of the multi-directional shock sensor of the invention, FIG. 17 is an enlarged cross section along the line D—D shown in FIG. 16, FIGS. 18 to 21 are plan views showing various examples of non-return means, FIG. 22 is a longitudinal section of an embodiment of the multi-directional shock sensor with open loop, FIG. 23 is a cross section, to a reduced scale, taken along the line E—E shown in FIG. 22, FIGS. 24A to E are plan views showing various examples of fluid resistance means, FIGS. 27 to 29 are longitudinal sections showing various embodiments of the shock sensor having a flexible zone adjacent the passageway, FIG. 30 is a longitudinal section showing an embodiment of the shock sensor having accelerating means, FIG. 31 is a cross section taken along the line F—F shown in FIG. 30, FIG. 32 is a longitudinal section showing an embodiment of the shock sensor in which a magnet forms part of the vessel, FIG. 33 is a longitudinal section showing an embodiment of the shock sensor having detection means of an electromagnetic induction type, FIG. 34 is a longitudinal section showing an embodiment of the shock sensor having detection means of variable electrostatic capacitance type, FIG. 35 is a longitudinal section showing an embodiment of the shock sensor having movable detection means, FIG. 36 is a cross section taken along the line G—G shown in FIG. 35, FIG. 37 is a longitudinal section showing another embodiment of the shock sensor having movable detection means, FIG. 38 is a cross section taken along the line H—H shown in FIG. 37, FIG. 39 is a longitudinal section showing a further embodiment of the shock sensor having movable detection means, FIG. 40 is a cross section taken along the line I—I shown in FIG. 39, FIG. 41 is a longitudinal section showing an additional embodiment of the shock sensor having movable detection means, FIG. 42 is a cross section taken along the line J—J shown in FIG. 41, FIG. 43 is a longitudinal section showing a still further embodiment of the shock sensor having movable detection means, FIG. 44 is a circuit diagram of an example of the electrical circuit used in the shock sensor of the invention, and FIGS. 45A–45I graphically show the waveforms appearing at various locations in the circuit of FIG. 44 during its operation.

DETAILED DESCRIPTION OF THE INVENTION

Figure 25:
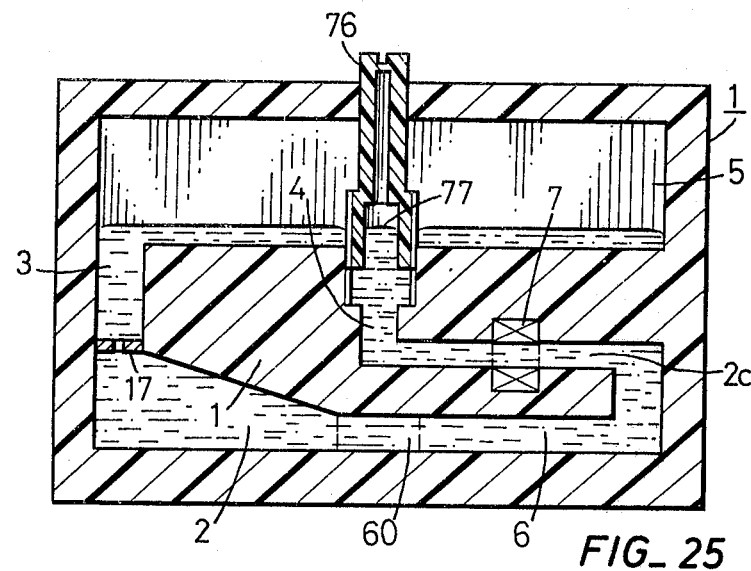
FIGS. 25 and 26 are longitudinal sections of embodiments of the shock sensor with control means.

Referring initially to FIGS. 1 to 3, a shock sensor constructed in accordance with one embodiment of the invention includes a parallelpiped vessel 1 formed of synthetic resin material such as epoxy resin and moulded with a fluid passageway 2 therein. The fluid passageway 2 extends lengthwise of the vessel 1 in the central region adjacent the bottom and communicates with a pair of vertical runs 3 and 4 which extend upwardly from the opposite ends of the passageway 2 at positions adjacent the opposite side walls of the vessel 1. In the example shown, the passageway is formed as a closed loop in that the upper ends of the vertical runs 3 and 4 communicate with each other through a return path 5 formed adjacent the top surface of the vessel 1. The passageway 2 is filled with a body of liquid 6. In order to prevent bubbles from remaining within the passageway 2, the latter may be partially formed with a gentle slope so as to rise slightly toward the vertical run 3.

The fluid 6 comprises a conductive fluid, for example, mercury, and detection means 7 is provided for detecting a movement of the fluid 6 and producing an indication thereof in terms of an electrical signal. In the example shown, the detection means 7 is constructed to operate on the principle of Fleming's rule of right hand, using a magnetic field established in a direction perpendicular to the direction of flow of the fluid 6 through the passageway 2. To this end, a magnetic yoke 8 is securely received within the vessel and has its one limb 8a internally secured with one end face of a permanent magnet 9 which is magnetised lengthwise. The other end face of the magnet 9 is spaced from the internal surface of the other limb 8b of the magnetic yoke 8, with the interposition of the fluid passageway 2 therebetween. In the drawings, the magnetic yoke 8 and magnet 9 are shown located toward the right-hand end of the passageway 2 with the limb 8a positioned above the other limb 8b which is in turn disposed substantially parallel to the bottom surface of the vessel 1 and with the joining portion between the both limbs 8a and 8b extending parallel to the passageway 2. In the region of the passageway 2 interposed between the magnetic yoke 8 and the magnet 9, a pair of electrodes 10 and 11 are arranged opposite the passageway 2 and spaced apart in a direction extending from the plane of the drawing, as viewed in FIG. 1, toward the viewer, that is, in a direction which is perpendicular to both the magnetic field created by the magnet 9 and the direction of flow of the fluid 6 through that region. Lead wires 12 and 13 connected to the pair of electrodes 10 and 11 extend externally of the vessel 1.

In the illustrated embodiment, the passageway is restricted in the region in which the detection means 7 is located so as to have a reduced rectangular cross-sectional area as compared with the remainder of the passageway in order to increase the flow of the fluid 6 in that region. Also the cross-sectional shape of the passageway in this region is chosen such that the shorter side of the rectangle is positioned between the magnet 9 and the limb 8b of the magnetic yoke 8 in order to achieve an increased field strength within the passageway 2. To provide filter means which prevents a movement of the fluid 6 in response to external vibrations and other extraneous factors, a pair of restrictions 16 and 17 are established by a pair of internal flanges 14 and 15 formed within the vertical runs 3 and 4, respectively. The return path 5 which permits a return flow of that portion of the fluid 6 which has moved past the detection means 7 is formed with a downward slope toward the vertical run 3. An assembly including the detection means 7 is formed as a moulding 18, which is closely fitted in a recess 19 in the vessel 1 and adhesively bonded therewith. A top cover 1a forming part of the return path 5 is adhesively secured to the top of the vessel 1. Preferably the moulding 18 has such a dimension as to permit the interconnection of passageway portions contained in the vessel 1 and the moulding 18 to be effected at a greater cross-sectional area of the passageway 2.

With the above arrangement, when the vessel 1 is shocked from the right to the left as viewed in FIG. 1, and indicated by an arrow 20, the vessel moves to the left while the conductive fluid 6 tends to remain in its position by virtue of the inertia, with the net result that the fluid 6 effects a relative motion from the left to the right, as viewed in FIG. 1, through the passageway 2. Such flow of the conductive fluid 6 is in a direction perpendicular to the magnetic field established across the limb 8b of the magnetic yoke and the magnet 9, and therefore induces, across the pair of electrodes 10, 11 arranged perpendicular to both the magnetic field and such flow and in contact with the flow, a voltage which, according to Fleming's rule of right hand, is proportional to the speed of flow of the fluid 6 and hence the magnitude of the shock 20 applied. In this manner, the shock 20 can be detected by measurement of the voltage appearing across the lead wires 12 and 13.

It will be appreciated from the described embodiment that the shock sensor of the invention operates based on the speed of flow of the fluid caused by shock, or a single integration of the shock rather than a double integration thereof to yield a displacement of a metal ball as described above in connection with the prior art, and this assures a rapid detection and good response. The elimination of a mechanical contact avoids the problem of degradation of such contact, thus improving the reliability. The shock sensor not only detects the presence or absence of a shock, but also can detect the magnitude thereof. Mechanical moving parts are eliminated, and by choosing the resonance frequencies when the fluid 6 passes through the space between the electrodes 10 and 11 outside the intended frequency range, which is a simple matter to do, malfunction is precluded. In the prior art example using a metal ball and a metal ring, the contact achieved between the ball and the ring operates an electrical circuit, and in view of the resulting arrangement in which the sensor and the operating part are constructed integrally, a difficulty is encountered in designing its dynamic characteristic and hence in distinguishing a signal from noises. By contrast, with the shock sensor of the invention, the presence of a shock is sensed as a voltage across the electrodes 10 and 11 which can be processed in an electrical circuit. Thus the sensor and the operating part are separate from each other, which permits an optimum design for the respective parts and thus facilitates the overall design. Another significant feature of the shock sensor according to the invention is the ability to produce an output which is proportional to the energy of the shock.

It will be seen that a greater specific gravity of the conductive fluid 6 is preferred to achieve an increased speed of relative motion between the conductive fluid 6 and the detection means 7. Mercury, having a specific gravity of 13.5 gr/cm$^3$, is contemplated as conductive fluid 6 in this regard. Mercury has advantages of being less susceptible to temperature variation of its specific gravity and having an extensive range of useable temperatures in view of its substantially uniform flow characteristic over a broad temperature range as demonstrated by the low freezing point of −38.8°C and the high boiling point of 356°C. When it is desired to extend the lower limit of the useable temperature range, thallium (Tl) may be added to the mercury in an amount of about 8.5% by weight to reduce the freezing point to −59°C.

Another advantage of using mercury is its compatibility with copper, making a close contact with or wetting a copper surface and thus reducing the electrical contact resistance therebetween. This allows the use of readily available and inexpensive copper for the electrodes 10 and 11. It is noted that mercury does not have a favorable wetting property with respect to iron. Poor wettability implies not only an increased contact resistance, but also the existence of small spaces in the area of contact which may move about across the contact surfaace to vary the contact resistance because of external vibrations, thus causing noises. However, it is found that the addition of 10 ppm to 0.1% by weight of magnesium (Mg) or 0.33% by weight of sodium (Na) provides a sufficient wetting property with respect to an iron electrode. Other additives for improving the wettability include K, Rb, Cs, Li, Ca, Sr, Ba and the like. Good wettability assures that an electrode, once laid in contact with another fluid such as silicone oil, can be well contacted by mercury when it is placed into fluid mercury.

Pure mercury exhibits little corrosive nature against an electrode made from copper, iron or the like, but may exhibit a relatively strong corrosion effect when it contains impurities in admixture. Such corrosion may result in the formation of an electrical insulation on the electrode surface, or the formation of fine particles within the fluid in the passageway 2 to degrade the flow characteristics or even block the passageway 2. Anti-corrosion protection can be achieved with a carbon steel electrode by adding about 100 to 200 ppm by weight of titanium (Ti) thereto.

The use of mercury as the conductive fluid 6 fulfills many of the requirements for the shock sensor. In addition, the operating conditions can be improved by additives to the mercury. By way of example, it is contemplated that 8.5% of Tl, 10 ppm to 0.1% of Mg and 100 to 200 ppm of Ti (all parts by weight) be added to the mercury, or 0.33% of Na and 100 to 200 ppm of Ti (all parts by weight) be added to the mercury when an iron electrode is used, and that Tl be added to the mercury on the order of 8.5% by weight when a copper electrode is used.

When this shock sensor is mounted on an automobile to detect a collision accident thereof, it is constantly subjected to weak vibrations during the running of the car, so that in the steady state condition, there is an output from the lead wires 12 and 13 which undulates or oscillates about a certain level with a small amplitude. It then follows that if a shock occurs at the instant of bottoming of the small undulation, the resulting shock signal will have a reduced peak value as compared to when it occurs at other instants. On the other hand, it is observed that when the output drops down upon termination of the shock, there occurs a downward overshoot beyond the steady state level. This is considered to be due to a contact potential difference between the electrodes 10, 11 and the conductive fluid 6 which is relatively high and which varies with the movement of the fluid 6. These fluctuations may be minimized by forming a thin insulating layer on the contact surface of the electrodes 10, 11 with the fluid 6, the layer being formed of a material having a reduced contact potential difference with respect to the fluid 6. It is desirable that the thin layer hardly be eroded by the fluid 6, have good adhesion with the electrode and have a thermal coefficient of expansion comparable to that of the electrode. Where the electrode comprises copper, iron, platinum or nickel, the thin layer may comprise a coating of high polymer insulating material such as epoxy resin, polyester resin and the like, or inorganic insulating material such as glass and the like. By way of example, a shock sensor was constructed with brine as fluid 6 and platinum electrodes 10, 11 to measure 50 kΩ across the electrodes. When a thin layer of epoxy resin was formed on the electrodes 10, 11 to increase the resistance thereacross to 500 kΩ, fluctuation in the steady state level was drastically reduced and the negative going overshoot of the output upon termination of the shock was virtually incapable of being measured. In order to reduce the fluctuation in the output level which is considered to be caused by a change in the contact potential difference, the electrodes 10 and 11 can be located within recesses 21, 22 formed opposite the passageway 2 so that they contact stagnant portion of the fluid 6 as illustrated in FIG. 4.

FIGS. 5 and 6 show an embodiment which provides a substantially uniform detection of shocks within an angular range of ±30° only when these shocks exceed a given magnitude. Parts in FIGS. 5 and 6 corresponding to those shown in FIGS. 1 to 3 are designated by like reference characters, and this also applies to the rest of the drawings. Beyond detection means 7, the passageway 2 is divided into a pair of branches 2a and 2b which form an angle of about 40°. A pair of vertical runs 3a and 3b are associated with the branches 2a and 2b, respectively. This embodiment includes threshold presetting means 23 which permits a relative movement between the fluid 6 and the detection means 7 only in response to a shock in excess of a given magnitude. At this end, the detection means 7 is located at substantially the center of the passageway 2 and the threshold presetting means 23 is disposed on the side of the detection means 7 opposite from the branches 2a and 2b. The threshold presetting means 23 comprises a movable valve 24 disposed in opposing relationship with the end face of the passageway 2 at its juncture with the vertical run 4 of the passageway 2 and urged in blocking abutment against the end face of the passageway 2 by a coil spring 25. Specifically, an extension of enlarged diameter 26 communicates with the passageway 2 and houses the cylindrical valve body 24 so as to be capable of advancing toward or retracting from the passageway 2. At its one end face, the valve 24 is formed with an annular rib 27 integrally, which can be brought into abutment against the peripheral edge of the passageway 2 at its end face, thereby blocking the passageway 2. The other end of the movable valve 24 is formed with a recess in which is disposed a second movable member 28. The member 28 is formed with a central opening 29 which receives a coaxial coil spring 25a of a limited strength to urge the valve 24 toward the passageway 2. Centrally in the wall defining the right-hand end of the enlarged extension 26 is formed another recess 30, in which is received a strong coil spring 25b to urge the second movable member 28 toward the passageway 2.

The right-hand wall of the vessel 1 is formed as a cap 31 blocking the enlarged extension 26, and can be screwed into the enlarged extension 26 for blockage thereof subsequent to assembling the valve 24, movable member 28 and other necessary parts therein. At its end adjacent the passageway 2, the enlarged extension 26 is sealed liquid-tightly by an annular seal member 32 comprising a flexible membrane such as rubber and having an inner peripheral portion held against the periphery of the valve 24 adjacent the passageway 2 by means of thread 33 and having an outer peripheral portion held against an abutment 35 formed integral with the inner periphery of the enlarged extension 26 by means of thread 34. By virtue of the provision of the threshold presetting means 23 in the embodiment shown, the passageway 2 is located centrally as viewed along the height of the vessel 1, and the magnet 9 is divided into two sections 9a and 9b which are secured with the respective limbs 8a and 8b of the magnetic yoke 8. The passageway 2 is formed to extend between the sections 9a and 9b.

When a shock 20 is imparted which is directed from the right to the left as viewed in FIG. 5, the valve 24 remains to block the passageway 2 to inhibit a flow of the fluid if the shock does not exceed a given magnitude. However, if the shock 20 exceeds the given magnitude, the force imparted to the fluid to cause it to flow exceeds the resilience of the springs 25a and 25b, whereby the valve 24 is moved to permit a flow of the fluid 6 within the passageway 2 into the vertical run 4, thus inducing a voltage across the electrodes 10 and 11 as an indication of detection of that shock. Thus the illustrated shock sensor can be mounted on an automobile to inflate or not to inflate a safety bag when the speed upon collision is above or below a given value, respectively. The shock sensor can be made insensitive to moderate shocks experienced by the chassis of an automobile when driving on a rough way. Because the output across the electrodes 10 and 11 is obtained as a time integral of shocks, a succession of moderate shocks as during driving on a rough way may result in a voltage of sufficient magnitude to cause a false detection. However, the described threshold presetting means prevents such possibility of a false detection by preventing the fluid from flowing in response to these moderate shocks. The provision of the branches 2a and 2b assures a detection with substantially uniform sensitivity of shocks from directions within a range of ±20° with respect to the length of the passageway 2. The use of a pair of cascade-connected springs such as shown at 25a and 25b in the described embodiment provides a rapid return of the valve 24 which has undergone a displacement upon shocking.

As illustrated in FIG. 7, a plate-shaped valve 24 may be pivotally mounted on a stud 36 at its one end and urged to block the end face of the passageway 2 by a torsion spring 25 which is wound around the stud 36 and has its one end secured to the vessel and its other end engaged with the valve 24.

The reliance upon the resilience of a spring described above may be replaced by the gravitational force on of a weight. This is illustrated in FIG. 8 wherein a gate 37 is provided intermediate the ends of a vertical run 4 and carries a weight 38 such as a ball of iron thereon which blocks the gate 37. When subjected to a shock in excess of a given magnitude, the fluid pressure rises to push the weight 38 upward to open the gate, whereby a movement of the fluid 6 occurs to provide an electrical signal as an indication of detection. The normal level of the fluid 6 may be set higher than the elevation of the gate 37 so that the weight 38 is immersed in the fluid 6 to provide a bias acting to urge it upward.

In FIG. 8, it will be seen that moderate shock may lift the weight 38 by a slight amount and then the weight 38 immediately blocks the gate 37 on account of gravity, and when this is repeated, a certain volume of the fluid 6 may be stored above the gate 37 to reduce the gravitational effect of the weight 38 to thereby cause a shift in the threshold. This can be avoided by filling the space both above and below the gate 37 with a fluid, such as silicone oil, having a specific gravity substantially less than that of the fluid 6 which may be mercury, for example.

The use of gravity may be replaced by buoyancy, as illustrated in FIG. 9. Here, a vertical run 4 is extended below the passageway 2 to form an extension 4a, and the extended end of the passageway 2 is bent downwardly so as to communicate with the extension 4a. Across the extended end of the passageway 2 is formed a gate 37, which is preferably conical in section, tapering downwardly. A float 39 is disposed within the extension 4a so as to block the gate 37 normally by close contact therewith. The float 39 is made of a material having a specific gravity less than that of the fluid 6, whereby buoyancy is created normally which causes the float 39 to block the gate 37. To provide a guide for the vertical movement of the float 39, the float 39 is centrally attached with an upstanding post 40 which extends through the gate 37. when a fluid pressure in excess of a given value is generated within the passageway 2, it depresses the float 39 to permit a flow of the fluid 6 into the vertical run 4, thus inducing a voltage across the electrodes 10 and 11.

Alternatively, FIG. 10 shows a gate 37 provided intermediate the ends of a vertical run 4 and a valve 24 positioned to block it, both of which are formed of magnetizable material and at least one of which is formed by a permanent magnet so as to produce a magnetic attraction therebetween. In the example shown, a temperature compensating member 170 is placed within the fuid passageway 2 so as to undergo a change in its shape and/or size upon temperature change to vary the cross-sectional area of the passageway 2 and hence the fluid resistance for providing compensation of a change in the speed of the fluid flow through the passageway 2 with varying temperature. The member 170 may be formed of a material having a different thermal coefficient of expansion than that of the vessel 1 or a bimetal which deforms with temperature to vary the fluid resistance within the passageway 2 for compensating for a change in the flow speed with varying temperature. Alternatively, the interface between the vertical run 4 and the return path 5 may be blocked with a low resilience membrane 41 such as a membrane of synthetic resin material or aluminum foil so that it may be torn by a fluid pressure in excess of a given value, as illustrated in FIG. 11.

Instead of utilizing a movable member in constructing the threshold presetting means 23, surface tension or cohesion of the fluid 6 may be applied. By way of example, FIG. 12 shows a threshold member 43 located in the vertical run 4. The member 43 is in the form of a thin plate with distributed pores 44. The fluid 6 is filled in the passageway 2 and the vertical runs 3 and 4 to a level such that it contacts the member 43. Immediately above the threshold member 43, diameter, with the enlargement extending downwardly to form a fluid sump 45. With a shock 20 directed from the right to the left as viewed in this FIGURE applied to the vessel 1, the fluid 6 tends to move, as a result of relative movement, to the right through the passageway 2. However, the pressure in the fluid 6 must exceed a given value dependent upon the cohesion (surface tension) of the fluid 6 before it can flow past the pores 44 in the threshold member 43. Thus for a shock 20 of magnitude less than a given value, the blockage afforded by the threshold member 43 presents a movement of the fluid 6 within the passageway 2, while when the given value is exceeded, the fluid 6 flows past the threshold member 43, thus causing its flow through the passageway 2.

By way of example, where mercury is used as the fluid 6, together with a nickel plate as the threshold member 43, a threshold of 10 g (g representing the gravitational acceleration) can be established by choosing the diameter of the pores 44 to be on the order of 30 microns. It is noted that shocks experienced by an automobile driving on a rough way are on the order of 3g, while shocks occuring upon collision and which do not endanger life are generally below 10 g. As the number of pores 44 is increased, the flow therethrough increases as does the detection output. A total area of the pores 44 is chosen greater than the cross-sectional area of the passageway 2 at the location of the detection means 7.

The portion of the fluid 6 which has moved past the threshold member 43 is received in the sump 45, so that the threshold member 43 is normally not covered by the fluid 6, thus maintaining the established threshold. In this respect, FIG.12A shows, to an enlarged scale, that the threshold member 43 can be shaped to bulge upwardly toward its center in order to avoid any fluid 6 resting on the top thereof. Pores 44 may comprise round apertures of an even diameter, an array of parallel or radial slits or a combination of round apertures and slits. When the fluid level in the other vertical run 3 having no threshold member mounted therein is established higher than the elevation of this member, it is always maintained in contact with the fluid 6 to maintain the threshold if the vessel 1 becomes inclined within a certain limit. When the fluid 6 fills the sump 45 to contact both surfaces of the threshold member 43, the threshold will be substantially reduced. When this occurs, the vessel 1 may be turned upside down to remove the fluid from upper side of the threshold member to permit a repeated use.

An alternative arrangement may be made for the fluid 6 which has moved past the threshold member 43 to return to the passageway 2 automatically without requiring such a manipulation. FIG. 13 shows an embodiment constructed in this manner. A vertical run 3, which does not have a threshold member, is made sufficiently thin to allow the fluid level threin to be positioned below the elevation of a threshold member 43 by utilizing capillary action. A return path 5 is formed with a ramp beginning with the location of the threshold member 43 in a vertical run 4 and downwardly extending to the vertical run 3. This allows that portion of the fluid 6 which has moved past the threshold member 43 to return through the path 5 to the vertical run 3 by gravity. In this embodiment, the threshold member 43 is constituted by a block-shaped assembly comprising a bundle of very thin pipe-shaped fibres (hollow fibres) adhesively connected together. FIG. 14 shows an alternative arrangement in which vertical runs 3 and 4 are of similar transverse size, but a return path 5 is constituted by a narrow path extending directly above the threshold member 43 to a lower part of the vertical run 3. If a threshold member 47 similar to the threshold member 43 is placed on top of the vertical run 3, an inclination of the vessel 1 in either direction can be accommodated for. Furthermore, a second return path 48 interconnecting the top of the both vertical runs 3 and 4 may be provided. The threshold member 43 is disposed in an angular position canted downwardly toward the narrow path 5 so as to help the fluid passed therethrough in returning through the path 5 without staying thereon.

Instead of locating the threshold member 43 in a vertical run as shown in the preceding embodiments, it may be located within the passageway 2. This is illustrated by FIG. 15 wherein a passageway 2 extends through the median region of a vessel 1 and detection means 7 is located centrally along the length of the passageway 2. Along the passageway 2, a threshold member 43 is located to the right of the detection means 7. To the right of the threshold member 43, the passageway 2 is inclined downwardly to be connected with a vertical run 4. The lower ends of the vertical runs 3 and 4 are connected with a second return path 49. The vertical run 4 is made sufficiently thinner than the other vertical run 3 so as to hold the fluid level within the vertical run 4 below the position of the threshold member 43 as a result of capillary action. A fluid resistance 50 is provided in the return path 49 and a restriction 51 is located within the vertical run 3 at a position below the passageway 2 in order to prevent an excessive flow of the fluid 6 into the second return path 49 upon shocking. When the fluid 6 moves past the threshold member 43, that fluid is returned to the return path 49 through the vertical run 4. In a practical example constructed, using a pore diameter of 30 to 40 microns for the threshold member, a diameter of 1.5 millimeters for the vertical run 4 and a diameter of 5 millimeters for the vertical run 3, a fall of 5 millimeters was obtained between the fluid levels within the vertical runs 3 and 4 when using mercury as the fluid 6. If a restriction 52 having a pore diameter in the range from several tens to several hundreds of microns is installed at the fluid level within the vertical run 3, a reverse flow caused by shocks directed in the opposite direction from the intended direction, that is, directed from the left to the right as viewed in this FIGURE, can be prevented.

Where it is desired to sense shocks from directions in a range broader than that shown in FIG. 5, additional branches distributed over a more extensive range may be provided. An embodiment of this kind is illustrated in FIGS. 16 and 17 in which a circular vessel 1 is used. A common passageway 2 extends radially from the center of the vessel, and in communication with the inner end 60 of the passageway 2 are a plurality of radially extending branches $2_1$ to $2_8$ centered about the inner end and angularly spaced apart by 30°, for example. Non-return means is provided in each of the branches $2_1$ to $2_8$ for allowing an unobstructed flow of the fluid toward the inner end or branch point 60, but hindering a reverse flow. To this end, each branch $2_1$ to $2_8$ is provided with a plurality of passages 62 extending alternately in opposite directions with respect to its respective center axis 61, with each passage 62 extending in a direction away from the center axis 61 as the distance from the inner end 60 increases. In this manner, a zigzag passage is formed. In each passage 62, a projection 63 extends vertically of the vessel 1 to produce an annular flow. Thus the fluid 6 flowing outwardly from the inner end 60 flows around the outer side of the respective projections 63 to return to the inner end 60, as indicated by arrow 64, and hardly reaches the outer end of the respective branches $2_1$ to $2_8$. However, any fluid that is directed from the outer end toward the inner end 60 is able to continue to flow while avoiding the projections 63, eventually reaching the inner end 60. Thus, non-return means is formed.

The outer end 65 of the respective branches $2_1$ to $2_8$ is formed with a circular bore, as viewed in section in a plane parallel to the bottom surface of the vessel 1, and each branch $2_1$ to $2_8$ is connected with the circular bore in a direction tangential to the circular bore 65. As a result, while the fluid entering the bore 65 from the inner end 60 is converted into an annular flow 66 around the periphery of the circular bore 65 and thus cannot flow into an overlying restricted opening 17 in a simple way, the fluid entering the branches $2_1$ to $2_8$ from the restricted opening 17 is readily conducted to the inner end 60 without forming an annular flow 66, thus completing the non-return means.

Referring to FIG. 17, when a shock 20 is applied to the vessel 1 in a direction toward the inner end 60 from the end of the common passageway 2 remote therefrom, the fluid 6 within branches $2_2$ to $2_7$ which are oppositely directed to the oncoming direction of the shock 20 will flow toward the inner end, with respective speeds of flow which correspond to the components of the respective branches $2_2$ to $2_7$ in alilgnment with the oncoming direction of the shock. Upon reaching the inner end 60, the fluid 6 from the branches $2_2$ to $2_7$ is unlikely to enter the branches $2_1$ and $2_8$ because of the existence of the non-return means mentioned above, and thus most likely flows into the common passageway 2, thereby activating the detection means to produce an electrical signal. A detection output of the same magnitude is obtained for shocks from directions within ±30° with respect to the axis of the common passageway 2.

Other non-return means than disclosed above can also be employed. By way of illustration, FIG. 18 shows a series of equi-distantly spaced baffles 67 extending from the opposite side walls of the common passageway 2 in a direction toward the inner end 60 (branch point) and a series of triangular islands 68 interposed between successive pairs of baffles 67, with the base of the triangle located nearer the inner end 60. As an alternative, FIG. 19 shows an alternate arrangement of short and long baffles 67, with short baffles on one side wall located opposite to long baffles on the other side wall. As a further alternative, a series of triangular islands 68 may be used alone as illustrated in FIG. 20. Moreover, a bifurcated island 69 as shown in FIG. 21 may be used with its bifurcation open toward the inner end 60 and the passageway 2 enlarged along the length of the bifurcations and formed with respective recesses 70 extending away from the inner end 60 and in communication with the outstretched ends of the bifurcated island 69.

It may be desired that the shock sensor have a varying sensitivity with the oncoming direction of a shock. For example, considering the situation when the shock sensor is mounted underneath the instrument panel of an automobile, a head-on collision will cause the shock to be transmitted to the sensor with a relatively small amount of damping because of relatively hard components which are housed in the front end of the automobile, with the result that the shock measures high. On the other hand, with a rear-end collision, the presence of relatively soft components such as seats and trunk room causes the shock to be transmitted to the sensor with a higher degree of the damping, with the result that a shock of same magnitude will be detected as one of lesser strength as compared with a head-on collision. In view of this, branches from the fluid passageway may be given differential fluid resistances so that an electrical output of approximately the same level can be produced, even though the shock from the front is transmitted as a stronger one than that transmitted from the rear. An embodiment of this type is illustrated in FIGS. 22 and 23 wherein a multiplicity of radial branches $2_1$ to $2_n$ are formed at an equal angular interval over the full circumference and communicate at their inner end 60 with a common passageway 2 which extends upwardly. In the illustrated embodiment, the vertical runs as shown at 3 and 4 in preceding FIGURES are eliminated and the branches $2_1$ to $2_n$ have their outer end closed. Above the common passageway 2 and in communication therewith is provided a chamber 75 which permits a flow of the fluid 6 to occur. Branches located in alignment or nearly in alignment with a direction designated by A in FIG. 23 have a minimum fluid resistance while a branch or branches in alignment with a direction C, which is opposite to the direction A, have a maximum fluid resistance, with the intermediate branches having an increasing fluid resistances as the direction C is approached. As illustrated in FIGS. 24A–24E, an increased fluid resistance can be achieved by forming a bend 71 in the passageway 2 (FIG. 24A), by providing projections 72 into the passageway 2 (FIG. 24B), by providing a restriction 17 (FIG. 24C), by forming a narrowed zone 73 (FIG. 24D) or by using differential pipe diameters FIG. 24E). Furthermore, the length of each branch may be simply increased or non-return means may be provided which allows an unobstructed flow in one direction, but present a resistance to a reverse flow.

With the above arrangement, when a shock is applied to the vessel 1 in the direction C, the fluid 6 within those branches fully or partially aligned with the direction A will move toward the inner end 60 and thence into the common passageway 2 as a result of relative movement, and conversely, when the vessel 1 is shocked in the direction A, the fluid within those branches fully or partially aligned with the direction C will flow into the common passageway 2. A bend 71 is formed in the branches aligned with the direction C to increase its fluid resistance, so that for a shock of the same magnitude, the fluid flow within the common passageway 2 will be at a reduced speed in this instance as compared to that in the former occurrence, with a consequent reduction in the level of an electrical signal detected. For shocks of the same magnitude, but applied in the directions B and D, the resulting electrical signal will be lower than when shocked in the direction C and higher than when shocked in the direction A. Stated differently, a shock applied in the direction A will produce an electrical signal comparable to that produced by a shock of lesser degree applied in the direction C. The arrows shown around the vessel 1 in FIG. 23 are intended to represent with their length the magnitude of shock required to be applied in those directions in order to produce an electrical signal of an even level, while the multiplicity of branches lie on a common plane in the described embodiment, alternate branches may be oppositely inclined with respect to a central plane so that an accurate detection is assured at a slightly inclined position of the vessel 1. The outer end of the respective branches may communicate with the chamber 75 through respective vertical runs.

When no return path is provided for the fluid 6 that has undergone movement, as in the arrangement shown in FIGS. 22 and 23, a vacuum is produced in the outer end of branches from which the fluid 6 is displaced, tending to keep back the moving fluid. This results in a sharp trailing edge of the detected electrical signal. The chamber 75 can be filled with a fluid having much less density than the fluid 6, for example, with silicone oil when the fluid 6 comprises mercury. This serves make the trailing edge of the detected electrical signal even more abrupt.

To have an abrupt trailing edge for the detected signal is of some significance depending on the applications intended. For example, when the shock sensor is mounted on an automobile, it will be seen that there is an intermittent occurrence of moderate shocks while driving on a rough way. It is desirable that the electrical signals resulting from these shocks be removed before the leading edge of the electrical signal that is produced by the next following shock occurs. In order to enhance this in a more positive manner, there may be provided damping means which causes the electrical signal to decay rapidly. FIG. 25 shows an embodiment of such type. The end of a common passageway 2 remote from the branch point 60 is folded back upwardly to form a horizontal run 2c along which detection means 7 is located. The free end of the horizontal run 2c communicates with the lower end of a vertical run 4 formed centrally in a vessel 1. The upper end of the vertical run 4 is closed by a close fit cap 76, which is constructed to be of a substantially reduced diameter above a point midway along its length. A fluid level 77 of a fluid 6 within the cap 76 is normally situated in the lower portion of a greater diameter.

When there occurs a flow of the fluid 6 through the passageway 2 as a result of application of a shock, the fluid moves through the horizontal run 2c to raise the fluid level 77 within the vertical run 4. As the fluid level 77 reaches the upper portion of reduced diameter, the gas pressure prevailing in the cap 76 increasely increases sharply to suppress the motion of the fluid 6. But for the cap 76, the fluid 6 which is set in motion upon shocking would continue to flow by inertia after termination of the shock, but the sharp rise in the gas pressure serves halt the motion of the fluid. The cap 76 is in threaded engagement with the vessel so that it may be turned from the exterior to adjust the volume of free space within the cap 76, thereby permitting the position in time at which a detected signal rises to be adjusted. It will be appreciated that the reduced diameter portion of the cap 76 may have the same diameter as the lower portion, if desired.

Figure 26:
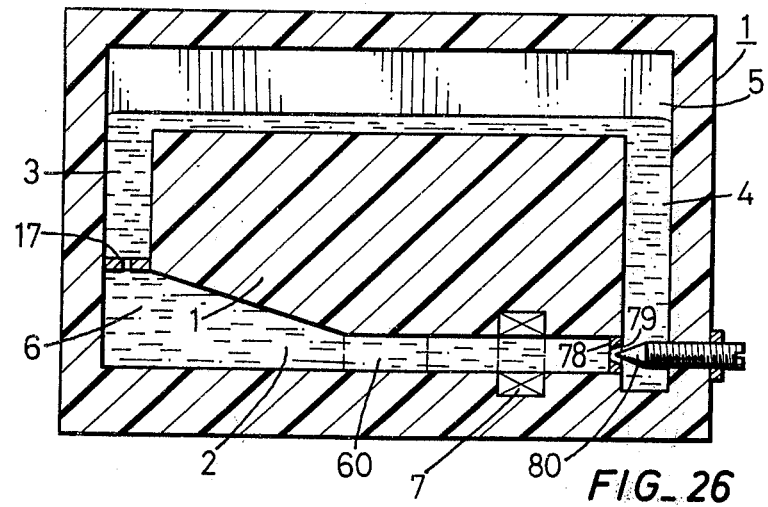

In place of damping the motion of the fluid by a change in the volume of a gas which occurs as a result of such motion, an arrangement may be made for an automatic damping in which the flow resistance increases rapidly as the speed of flow increases, by utilizing the fact that the flow resistance of a fluid varies in proportion to the square of the speed of flow. An embodiment constructed in this manner is shown in FIG. 26 wherein at the end of a common passageway 2 remote from the branch point 60, a plate member 79 having an opening 78 therein is arranged to block the passageway 2, and a cone-shaped valve 80 is reciprocably mounted in opposing relationship with the opening 78. When the valve 80 is appreciably advanced into the opening 78, there will be a high resistance to the flow through the passageway 2. By suitable choice of the resistance, the arrangement is set such that the fluid is permitted to move upon shocking, but the damping effect offered by such resistance becomes effective when the speed of flow exceeds a given value.

In the preceding embodiments, the vessel 1 and the fluid passageway 2 have been formed of a rigid material, but they may be partially flexible so that the flexible part deforms upon shocking to cause a movement of the fluid. FIG. 27 shows a pipe-shaped body which serves as a fluid passageway 2 as well as a vessel. Both ends of the passageway 2 are closed by flexible membranes formed of rubber, flexible synthetic resin or the like, which constitute flexible parts 81 and 82. These flexible parts 81 and 82 are clamped against the outer periphery of the passageway 2 by means of clamp rings 83 and 84, respectively, thereby sealing the passageway 2. Conductive fluid 6, for example, mercury, is filled into the passageway 2. Detection means 7 is provided which detects a flow of the fluid 6 within the passageway 2 by conversion into an electrical signal. As shown at 20, if the passageway 2 is shocked from the right, the fluid 6, by its inertia, moves relative to the passageway 2 toward the oncoming direction of the shock. Such movement of the fluid 6 exerts a pressure upon the flexible part 82, which therefore undergoes an outward deflection as indicated by dotted lines, thus allowing the fluid 6 to move through a greater extent. The ability to fill the sealed passageway 2 with fluid 6 allows a simple arrangement and facilitates its handling.

While in the above embodiment, a deformation of the flexible parts 81 and 82 is effected by a movement of the fluid 6, the shock may move a driving body which in turn deforms the flexible part to cause a movement of the fluid. By way of example, FIG. 28 shows a block-like driving body 85 having a large mass arranged in opposing relationship with a flexible part 81. On the side of the driving body 85 remote from the flexible part 81, there is interposed between the body and an anchorage 86 a coil spring 87 which suppresses the driving body 85 from moving toward the flexible part 81. Upon application of a shock 20, the fluid 6 tends to move as mentioned before, but in this instance, the large mass of the driving body 85 causes it to move, against the resilience of spring 87, with sufficient force, upon receiving the shock 20 in excess of a given magnitude, to crush the flexible part 81 inwardly to a greater degree, thereby causing a greater travel fluid 6 and a greater electrical output.

In the two embodiments described above, the fluid passageway 2 is provided with flexible parts 81 and 82 at its opposite ends, so that when one shrinks, the other expands, and subsequently said one part reverts to shrinkage, which imparts a damping action upon the movement of the fluid 6, thus enabling a detected output with good damping characteristic to be obtained.

FIG. 29 shows a vertically extending fluid passageway 2, the intermediate portion of which is formed by a flexible part 81 all around its circumference, and the flexible part 81 is surrounded by a ring-shaped driving body 85. The shock sensor shown is adapted to detect a shock from any direction around the passageway 2. The portion of the passageway 2 around which detection means 7 is disposed is reduced in cross-sectional area to increase the speed of flow therethrough.

A movable body for enhancing a movement of the fluid within the passageway 2 can also be provided, as illustrated by FIG. 30. In a portion of a fluid passageway 2 removed from detection means 7, there is disposed a movable body 85 which is in loose sliding engagement with the passageway and which is formed of material having a substantially greater specific gravity than the fluid 6. A return spring 87 is connected between the body 85 and the inner surface of a vessel 1. A pair of stops 88 and 89 are secured to the wall of the passageway 2. Upon receiving a shock 20, the fluid 6 itself is forced to move toward the oncoming direction of the shock, but the movable body 85 is subjected to an even greater force, whereby the fluid 6 is urged by the moving body 85 to move to the right, as viewed in this Figure, with a high speed. The spring 87 functions also to preset the threshold. If the movable body 85 were formed of a material having a specific gravity less than that of the fluid, there could be achieved a noise suppression effect which precludes the fluid 6 from movement in response to noises such as minor vibrations.

In FIG. 30, the shock sensor is constructed to detect a change in its own position or attitude. To this end, a return path 5 is constructed to occupy a wide area, at four corners of which are disposed rod-shaped electrodes 90, 91, 92 and 93 (see also FIG. 31, 93 being obstructed in FIG. 30) which extend through the vessel wall. If the vessel 1 is tipped to the left, as viewed in FIG. 30, the electrodes 90 and 92 become connected through the fluid 6, while the electrodes 91 and 93 become connected if the vessel tips to the right. Similarly, the electrical conduction will be established between the electrodes 90 and 91 or between the electrodes 91 and 93, respectively, if the vessel turns to the forward side or to the rear side, respectively. The electrical conduction thus established between various electrodes can be utilized to detect a change in the attitude of the vessel such as may be found in the event of overturn or lateral turning of an automobile in which the shock sensor is mounted.

It is readily seen from the foregoing description that a magnet for establishing a magnetic field is needed when detection means 7 utilizes Fleming's rule of right hand. When attempting to increase the field strength for obtaining an increased output, a magnet of greater size will have to be used, but such magnet can be used to form part of the vessel 1. This is illustrated in FIG. 32 which shows a shock sensor of the type described above in connection with FIGS. 16 and 17. The vessel 1 is disc-shaped, and one-half of the passageway 2 is in the form of radial branches. The bottom plate 1a and top plate 1b of the vessel 1 are magnetized in the direction of thickness, respectively, with magnetic poles of opposite polarities facing each other. Secured to the top plate magnet 1a is a magnetizable body 94 which extends to the region of the common passageway 2, and establishes a magnetic field across the common area of the passageway 2 between the free end face of the body 94 and the bottom plate magnet 1b. The side wall of the vessel 1 may be constituted by a magnetic yoke.

In the example shown in FIG. 32, the space within a return path 5 is filled with a body of second fluid 95 which has a specific gravity less than that of the fluid 6 and is mutually insoluble and non-reactive with the fluid 6. The damping oscillation subsequent to the movement of the fluid 6 upon shocking is rapidly suppressed by the presence of the second fluid 95. The fluid 6 may comprise an ionic fluid such as brine, an aqueous solution of sulfuric acid or caustic soda, or mercury or the like while the second fluid 95 may comprise an oily material such as silicone oil.

Detection means 7 other than those described above may be used, including one that utilizes electromagnetic induction. By way of illustration, FIG. 33 shows a movable body 96 slidably arranged in one-half of a fluid passageway 2 and having its one end enlarged to the vicinity of the inner periphery of the passageway 2 to act as a guide 96a substantially conforming thereto. The guide 96a of the movble body 96 can move through the passageway 2 between a pair of projections 88 and 89 mounted on the upper and lower wall of the passageway 2 and spaced apart lengthwise thereof. A coil spring 87 is connected between the outer end of the guide 96a and the left-hand side wall of the vessel 1 for urging the movable body 96 to the left, as viewed in this FIGURE.

The movable body 96 is constituted by a permanent magnet, with its N- and S-poles located at the axial ends thereof. Around the inner periphery of the other one-half of the passageway 2 is mounted a coil 100. When a shock 20 in excess of a given magnitude is applied to the vessel 1 in a direction from its right-hand side wall to the left, as shown, the movable body 96 placed within the fluid passageway 2 moves by inertia, as a result of relative movement, against the resilience of the spring 89, toward the oncoming direction of the shock 20 and into the interior of the coil 100. Thus a voltage 100 is produced across the coil 100 which is proportional to the rate of change of flux in the coil 100.

Detection means 7 may also utilize electrostatic induction to effect conversion into an electrical signal. By way of illustration, FIG. 34 shows the substitution of a pair of electrode plates 10, 11 for the coil 100 of the preceding embodiment and the use of a material having a dielectric constant substantially different from that of the fluid 6 for the movable body 96. The electrodes 10, 11 are disposed opposite to each other across the passageway 2. The fluid 6 used in this instance comprises an electrically insulating fluid such as for example, silicone oil. Upon application of a shock 20, the movable body 96 moves, either directly or urged by the flow of the fluid 6, into the space between the electrodes 10, 11 whereupon the electrostatic capacitance therebetween changes. Hence, by connecting the electrodes 10, 11 across a voltage source, the change in the electrostatic capacitance can be detected in terms of an electrical signal. The movable body 96 may be constituted by an electrical conductor.

In the embodiments illustrated in FIGS. 33 and 34, the shock sensor is arranged so that part of the detection means 7 moves. A further embodiment of this kind is illustrated in FIGS. 35 and 36 wherein a vessel 1 is shown in the form of a hollow cylindrical body, closed at both ends, with a cylindrical fluid container 101 formed therein integrally with one end plate 1a of the vessel 1 and in coaxial relationship therewith. Conductive fluid 6 such as mercury or brine is contained within the container 101. A pair of permanent magnets 9a and 9b are disposed centrally on the outer periphery of the fluid container 101 at diametrically opposite positions, with their poles of opposite polarities facing toward each other, to establish a magnetic field across the conductive fluid 6. These magnets are arranged for axial movement.

A pair of rod-shaped electrodes 10 and 11 comprising pure iron, copper or the like and oriented in a direction perpendicular to both the magnetic field and the direction of movement of the magnets 9a, 1b are supported within the conductive fluid 6 for unitary movement with the magnets 9a and 9b. To this end, the electrodes 10 and 11 are passed through small apertures formed in the end plate 102 of the fluid container 101. The end plate 102 is spaced from the oppositely located end plate 1b of the vessel 1 to form a space, in which a cylindrical support 103 is loosely fitted over the periphery of the fluid container 101. The support 103 has an end plate 103a which securely holds the electrodes 10 and 11, and also has recesses 104 and 105 formed in its other end within which the magnets 9a and 9b, respectively, are received and secured.

A return spring 89 comprising a coil spring surrounding the container 101 is interposed between the end plate 1a of the vessel 1 on one hand and the magnets 9a, 9b or support 103 on the other hand. While not shown, the vessel 1 may be internally formed with axially extending, shallow grooves engaged by the ends of the magnets 9a and 9b for guiding the axial movement thereof. Flexible conductors 12 and 13 are connected between the support 103 for the electrode 10 and 11 and a pair of terminals mounted in the end plate 1b of the vessel. Water-tight rings 106 are interposed between the electrodes 10, 11 and the wall of apertures through which they pass. In order to allow an escape of the fluid 6 from within the container 101 when the electrodes 10 and 11 are moved deeply into the latter, a channel 107 is formed in the end plate 1a in communication with the container 101 and extends upwardly. The end of the channel 107 is closed by a plug 108.

Upon application of a shock 20 from the right as viewed in FIG. 35, the magnets 9a and 9b remain in their position by inertia while the vessel 1 tends to move alone, so that the magnets 9a and 9b move relative to the vessel 1 toward the oncoming direction of the shock 20. Hence a voltage is generated across the electrodes 10 and 11 which is determined by Fleming's rule of right hand. FIGS. 37 and 38 show an alternative arrangement in which a vessel 1 is filled with fluid 6 and a pair of magnets 9a and 9b are mounted on an annular support 103 at diametrically opposite positions, with a pair of electrodes 10 and 11 mounted thereon at diametrically opposite positions displaced 90° from the positions of the magnets. A pair of return springs 89a and 89b are interposed between the opposite end faces of the support 103 and the both end walls 1a and 1b, respectively, of the vessel 1, these springs also serving to carry the support 103 within the vessel 1. The magnets 9a and 9b are shown interconnected by a magnetic yoke 8. The coil springs shown in FIGS. 37 and 38 for holding the detection means, that is, the support 103 carrying the magnets 9a, 9b and the electrodes 10, 11, may be replaced by a return leaf spring 89, shown in FIGS. 39 and 40, which is securely mounted in the bottom wall of a parallelpiped vessel 1 and carrying the detection means at its free end. As a further alternative arrangement, FIGS. 41 and 42 illustrate that magnets 9a and 9b are secured to a vessel 1 while block-shaped electrodes 10 and 11 are adapted to move within the vessel upon shocking. Alternatively, while not shown, an arrangement can be made for the magnets 9a, 9b to move alone.

A further embodiment including a movable part in the detection means 7 is illustrated in FIG. 43 in which a disc 109 is held spaced from the inner periphery of a circular vessel 1 in concentric relationship therewith, thereby forming a passageway 2, vertical run 3 and return path 5. Centrally in the space between the disc 109 and the bottom wall 1b of the vessel 1 is disposed detection means 7, which comprises a pair of hollow conical bodies 110 and 111 which are held in abutment at their apices and disposed in alignment with the axis of the vessel 1. The lower conical body 110 is secured to the vessel 1, while the upper conical body 111 is mounted on the lower conical body 110 so as to be povitable about its apex. At this end, the apices of both conical bodies 110 and 111 are truncated by planes normal to the repective axes and formed with annular ribs 112 and 113 of different diameters around the peripheral edge of the truncated end, which ribs are fitted together. A spacing is maintained between the disc 109 and the base of the upper conical body 111. In order to detect the displacement of the upper conical body 111, that is, its pivotal motion, in terms of an electrical signal, a pair of electrode plates 10 and 11 are applied to the end faces of the respective conical bodies 110 and 111, respectively, to form a capacitor therebetween. The electrodes 10 and 11 are connected through lead wires 12 and 13, respectively, to the terminals mounted on the vessel 1.

When the vessel 1 is subjected to a shock 20 directed from the right to the left, for example, the fluid 6 moves relative to the vessel 1 from the left to the right. The resulting flow of the fluid acts on the conical bodies 110 and 111 to cause the upper conical body 111 to undergo a pivotal displacement about the edge of its end face located on the side nearer the oncoming direction of the shock by an amount dependent upon that component of the flow pressure which acts normal to the conical surface. The electrostatic capacitance between the electrodes 10 and 11 is reduced in a manner corresponding to the amount of such displacement, and this reduction can be detected as an electrical signal. In the illustrated embodiment, a shock from any direction about the axis of the vessel 1 can be detected.

The shock is detected by way of the electrical signal across the output lead wires of the respective shock sensors in order to operate an ignition operation, for example, for release of gas into a safety bag when the shock sensor is used for the purpose of providing a safeguard against a collision accident of an automobile. A circuit arrangement as shown in FIG. 44 can be used to provide a triggering operation in response to an electrical signal developed across the terminals 12 and 13. In the circuit arrangement shown, the signal from the output terminals of the shock sensor is coupled to an input terminal 115, and thence through a direct-coupled amplifier 118 comprising a pair of transistors 116 and 117 to the base of a transistor 119 connected in an emitter follower configuration. The emitter resistor 120 of the transistor 119 has a relatively high resistance of, say, 100 kω, and the signal at the emitter of the transistor 119 is fed through a capacitor 121 to the non-inverted input 123 of a differential amplifier 122. The differential amplifier 122 comprises a pair of transistors 124 and 125 connected in a common emitter configuration, and having their emitters grounded through a common emitter resistor, their collectors connected with a power supply terminal 126 through respective collector resistors, and their bases connected with the non-inverted input terminal 123 and an inverting input terminal 127, respectively. The collector of the transistor 124 is connected with the base of a transistor 128 which has its emitter grounded and its collector connected with an output terminal 129 and also through a resistor with the supply terminal 126.

The output terminal 129 is connected with the non-inverted input terminal 123 through a resistor 130 which forms a feedback circuit. A reference voltage is applied to the inverting input terminal 127. To this end, a voltage divider comprising series connected resistors 131 and 132 are connected across the supply terminal 126 and the ground, with the junction between these resistors 131 and 132 connected through a resistor 133 to the inverting input terminal 127. This junction is also connected through a resistor 134 to provide a base bias to the transistor 124 which is connected with the non-inverted input terminal 123.

In the sample shown, the output is adapted to fire a thyristor 135. The output terminal 129 is connected with the gate of the thyristor 135 through a resistor 136 and a diode 137 in series. The thyristor 135 has its anode connected with a load 138 and its cathode grounded.

The circuit arrangement shown is also designed to prevent malfunction from being caused by transients upon on- and off-control of the power supply. Specifically, a power supply 139 is connected through a master switch 140 and a resistor 141 with the supply terminal 126 and is also grounded through a resistor 142 in series with a capacitor 143. The junction between the resistor 142 and the capacitor 143 is connected with the anode of the thyristor 135 through the load 138. The supply terminal 126 is grounded through a Zener diode 145 and is also connected through a diode 146 and a resistor 147 in series with the collector of a transistor 148. The junction 144 is grounded through a bias circuit 149, and is also connected with the resistor 147 through a diode 150. The transistor 148 has its base connected with the bias circuit 149, and its emitter grounded. The collector of the transistor 148 is connected through a diode 151 with the emitter of the transistor 119, and connected through a diode 152 with the inverting input terminal 127 and also connected through a resistor with the base of a transistor 153. The transistor 153 has its emitter grounded and its collector connected with the gate of the thyristor 135 and also grounded through a resistor 154. The junction of the supply terminal 126, constant-voltage element 145 and diode 146 is connected through a diode 155 with the bias circuit 149.

In operation, the master switch 140 is initially turned on to bring the circuit into a steady state condition. When an input pulse is now received at the input terminal 115, it is amplified by the amplifier 118 and fed to the emitter follower transistor 119 to render it conductive, whereby the capacitor 121 is rapidly charged through this transistor to supply an input pulse to the non-inverted input terminal 123. When the level at this terminal 123 exceeds that of the inverting input terminal 127, an output is produced by the differential amplifier 122, which output is fed back through the resistor 130 to the input terminal 123 in a positive manner. As a result, the level at the output terminal 129 sharply rises substantially to the level of the supply terminal 126, and remains maintained even after the input pulse disappears, by virtue of the positive feedback action. This output renders the thyristor 135 conductive, and power is supplied to an ignition charge or priming composition, for example, for causing release of gas into a safety bag.

Because the input pulse is compared against the reference level in the differential amplifier 122, it is assured that a relatively low level of the input is sufficient to provide a triggering action. This triggering action is even more enhanced by virtue of the positive feedback from the amplifier 122 through the positive feedback resistor 130 which allows the discharge of the charged capacitor 121 to take place through a relatively high resistance of the resistor 120 to thereby increase the effective pulse width and thus allow the positive feedback action to remain fully operative, even though the input pulse itself may not have a sufficient dureation to ensure keeping the triggering action over a satisfactory period of time. The time constant of this discharge is principally determined by the resistor 120 and the capacitor 121, which may have values of 100 k$\Omega$ and 10 $\mu$F, respectively. The circuitry added to the differential amplifier 122 is only the charging and discharge circuit including resistor 120, capacitor 121, positive feedback resistor 130 and the like, which is simple in arrangement and can be operated from a common power supply, thus making it convenient for use with a portable unit. Because a pulse of narrow width is converted into one having an increased width, the differential amplifier 122 including the positive feedback circuit can be constructed with an inexpensive circuit of low operational circuit.

The requirement arrangement shown prevents malfunction from being caused by transients when controlling the master switch 140. When the master switch 140 is turned on, the supply terminal 126 will rise to a given voltage instantly, while the potential at the junction 144 will rise gradually because of charging of the capacitor 143. Thus, turn-on of the switch 140 immediately applies a voltage to the base of the transistor 153, which is therefore rendered conductive to provide a short circuit across the gate and cathode of the thyristor 135, thereby preventing mis-firing of this thyristor. The potential at the supply terminal 126 is also applied through the resistor 147 and diode 151 to the emitter of the transistor 119 to provide a deep bias thereto, preventing this transistor from being rendered conductive by transient pulses. The same potential is also applied through the resistor 147 and diode 152 to the inverting input terminal 127 to lower the output from the amplifier 122 forcibly, thus preventing the thyristor 135 from being fired. The voltage applied through the diode 151 to the emitter of the transistor 119 for the purpose of preventing malfunction is also applied through the capacitor 121 to the non-inverted input terminal 123, but remains lower than the voltage applied through diode 152 to the inverting input terminal 127 because of the voltage drop across a resistor 156 connected in series with the capacitor 121, with consequence that the potential at the output terminal 129 is held at a low level. When the potential at the junction 144 reaches a given value, the transistor 148 conducts to remove the malfunction-preventing voltages applied through the diodes 151 and 152, and at the same time the transistor 153 is rendered nonconductive, making the thyristor 135 free to operate. When the master switch 140 is turned off, the potential at the supply terminal 126 immediately returns to zero, lowering the base potential of the transistor 148 to turn it off. On the other hand, the charge on the capacitor 143 renders the transistor 153 conductive, thus making the thyrister 135 inoperable. Also the malfunction-preventing voltage is applied from the capacitor 143 through the diodes 151 and 152. In this manner, the circuit is prevented from malfunctioning in response to transients occurring when the master switch 140 is turned on and off.

FIGS. 45A–45I show shows wave forms appearing at various points throughout the circuit of FIG. 44. Specifically, curve A represents the voltage at the supply terminal 126, curve B at the junction 144, curve C at the collector of the transistor 148, curve D at the input terminal 115, curve E at the emitter of the transistor 119, curve F at the non-inverted input terminal 129, and curve I at the gate of the thyristor 135. These illustrations are depicted for an assumed operation in which the master switch 140 is turned on at time $t_1$, an input pulse is received at time $t_2$, and the switch 140 is turned off at time $t_3$.

Having described the invention, what is claimed is:
1. A shock sensor comprising:
   a. a vessel containing a fluid passageway for receiving a conductive fluid therein;
   b. a body of conductive fluid contained in said fluid passageway;
   c. means in said vessel for permitting said conductive fluid to move in said fluid passageway;
   d. detection means disposed within the vessel for relative movement with respect to the fluid when the vessel is subjected to a shock, said detection means comprising:
      i. magnetic means for establishing a magnetic field in a direction substantially perpendicular to the direction in which the fluid moves within the fluid passageway;
      ii. a pair of electrodes disposed in opposing relationship with each other within the fluid passageway and spaced apart in a direction substantially perpendicular to both the magnetic field and the direction of movement of the fluid to detect said relative movement and to produce an indicative electrical signal; and
   e. threshold presetting means disposed at a point in said passageway for preventing the movement of said conductive fluid beyond said threshold presetting means in said passageway until the shock to which said vessel is subjected exceeds a given magnitude and for thereupon passing a quantity of said fluid.

2. A shock sensor according to claim 1 wherein said threshold presetting means comprises a movable body blocking the fluid passageway, and bias means for urging the movable body to maintain the blocking of the fluid passageway, said movable body moving to release the blocking against the bias provided by the bias means upon occurrence of a pressure in the fluid in excess of the given magnitude.

3. A shock sensor according to claim 1 wherein said threshold presetting means comprises a threshold member having an aperture formed therein and disposed to block the movement of the fluid in said passageway, said opening being of such a dimension that the fluid is constrained by the surface tension thereof to one side of the threshold member for a shock applied to said vessel below the given magnitude, but passes through the aperture in the threshold member in response to a shock in excess of the given magnitude.

4. A shock sensor according to claim 1 wherein said means for permitting the fluid to move comprises a chamber in communication with the fluid passageway.

5. A shock sensor according to claim 1, including damping means which becomes operative at a movement of the fluid which exceeds a given amount.

6. A shock sensor according to claim 1 in which the fluid passageway comprises a common passageway, and a plurality of branch passages extending in a plurality of directions from the common passageway said detection means detecting a flow of the fluid in the common passageway.

7. A shock sensor according to claim 6, in which at least one of the branch passages have a fluid resistance different from that of the remaining branch passages.

8. A shock sensor according to claim 6 in which the plurality of branch passages lie substantially on a common plane, and the common passageway is positioned in a direction transverse to the plane.

9. A shock sensor according to claim 1 in which the magnetic field establishing means of the detection means comprises a permanent magnet which forms at least part of the vessel wall.

10. A shock sensor according to claim 1 further comprising a thin insulating layer interposed between said electrodes and said fluid for decreasing the contact potential difference therebetween.

11. A shock sensor according to claim 1 in which the fluid passageway is formed with a recess, and an electrode is disposed at a retracted position within the recess so as to be opposite the fluid passageway.

12. A shock sensor according to claim 1 in which the fluid comprises mercury.

13. A shock sensor according to claim 1 in which the fluid comprises mercury as a main constituent, and an additive effective to lower the freezing point of the fluid.

14. A shock sensor according to claim 1 further comprising a flexible member defining at least part of and extending about the entire periphery of the fluid passageway, and an annular driving body surrounding the flexible member and adapted to undergo a displacement upon being shocked, said displacement of the driving body being effective to deform the flexible member and move the conductive fluid in the fluid passageway.

15. A shock sensor according to claim 1 in which a second body of fluid having a different specific gravity from and isoluble in the body of conductive fluid is contained within the vessel in contact with the conductive fluid.

16. A shock sensor according to claim 1, wherein said threshold presetting means comprises non-return means disposed in the fluid passageway for presenting a fluid resistance to fluid movement in one direction and a different fluid resistance to a fluid movement in the opposite direction.

17. A shock sensor according to claim 1 further including a chamber in said vessel in communication with the fluid passageway and in which the conductive fluid is normally absent, and a third electrode disposed within said chamber, said chamber and said passageway being disposed such that when the position of said vessel changes through a given angle, said conductive fluid will occupy the space between said third electrode and at least one of said pair of electrodes to provide and electrical connection therebetween.

18. A shock sensor according to claim 1, including a movable body disposed for free movement within the fluid passageway.

19. A shock sensor according to claim 1, further including a trigger circuit responsive to the indicative electrical signal from the detection means for producing a triggering signal when the electrical signal from the detection means exceeds a given level.

20. A shock sensor according to claim 19 in which the trigger circuit is supplied with the electrical signal from the detection means, said trigger circuit comprising a charging and discharge circuit having a discharge time constant greater than its charging time constant for receiving the electrical signal, a differential amplifier having two input terminals with one input supplied with the output from the charging and discharge circuit, a positive feedback circuit for receiving the output of the differential amplifier and returning it to said one input, and a source of reference signal connected with the other input of the differential amplifier.

21. A shock sensor according to claim 1 further comprising temperature compensation means located within said fluid passageway for compensating for a change in the velocity of the flow of conductive fluid with temperature variation.

22. A shock sensor according to claim 1 wherein said means for permitting the fluid to move comprises return passage means communicating with said fluid passageway for forming a loop in said vessel to permit return of the fluid after passing said threshold presetting means.

23. A shock sensor according to claim 1 wherein said threshold presetting means comprises a plurality of hollow fibres.

24. A shock sensor according to claim 23 wherein said hollow fibres are adhesively connected in the form of a block.

25. A shock sensor according to claim 1 further comprising rapid return means for rapidly drawing back a flow which has occurred within the passageway.

* * * * *